(12) United States Patent
Wiseman

(10) Patent No.: US 11,644,376 B2
(45) Date of Patent: May 9, 2023

(54) DIRECTIONAL DIFFERENTIAL PRESSURE DETECTOR

(71) Applicant: AirFlow Direction, Inc., West Newbury, MA (US)

(72) Inventor: Brian M. Wiseman, West Newbury, MA (US)

(73) Assignee: AirFlow Direction, Inc., West Newbury, MA (US)

(*) Notice: Subject to any disclaimer, the term of this patent is extended or adjusted under 35 U.S.C. 154(b) by 0 days.

(21) Appl. No.: 17/555,283

(22) Filed: Dec. 17, 2021

(65) Prior Publication Data

US 2022/0178777 A1 Jun. 9, 2022

Related U.S. Application Data

(63) Continuation of application No. 17/078,041, filed on Oct. 22, 2020, now Pat. No. 11,415,475.

(60) Provisional application No. 62/924,679, filed on Oct. 22, 2019.

(51) Int. Cl.
G01L 19/00 (2006.01)
G01L 13/04 (2006.01)

(52) U.S. Cl.
CPC .......... *G01L 13/04* (2013.01); *G01L 19/0092* (2013.01)

(58) Field of Classification Search
None
See application file for complete search history.

(56) References Cited

U.S. PATENT DOCUMENTS

| | | | |
|---|---|---|---|
| 2,497,255 | A | 2/1950 | Brown |
| 2,542,442 | A | 2/1951 | Weber |
| 3,397,319 | A | 8/1968 | Locke |
| 3,815,542 | A | 6/1974 | Cooper |
| 3,930,568 | A | 1/1976 | Levey |
| 4,040,650 | A | 8/1977 | Shotbolt |
| 4,139,466 | A | 2/1979 | Rosaen |
| 4,154,101 | A | 5/1979 | Buchanan et al. |
| 4,271,693 | A | 6/1981 | Bute |
| 4,486,744 | A | 12/1984 | Pratt et al. |

(Continued)

FOREIGN PATENT DOCUMENTS

| | | |
|---|---|---|
| FR | 2 428 845 A1 | 1/1980 |
| GB | 394 145 A1 | 6/1933 |

(Continued)

OTHER PUBLICATIONS

Invitation to Pay Additional Fees for International Application No. PCT/US2020/056933, dated Dec. 17, 2020.

(Continued)

*Primary Examiner* — Brandi N Hopkins
*Assistant Examiner* — Nigel H Plumb
(74) *Attorney, Agent, or Firm* — Wolf, Greenfield & Sacks, P.C.

(57) ABSTRACT

Methods and apparatuses for indicating the presence of a threshold directional differential pressure between separated adjacent spaces. An inclined conduit contains at least one movable element that indicates whether the pressure difference between the two spaces is at least as high as a threshold pressure difference. The apparatus may provide a compact arrangement while allowing the movable element to have a suitable travel path length within the conduit.

20 Claims, 15 Drawing Sheets

(56) References Cited

U.S. PATENT DOCUMENTS

| | | | |
|---|---|---|---|
| 4,679,827 A | | 7/1987 | Law |
| 4,787,251 A | | 11/1988 | Kolodiski |
| 4,819,577 A | | 4/1989 | Campau |
| 5,195,376 A | * | 3/1993 | Banks .................. G01L 19/12 |
| | | | 73/756 |
| 5,291,182 A | | 3/1994 | Wiseman |
| 5,343,753 A | | 9/1994 | Boutin |
| 5,410,298 A | | 4/1995 | Wiseman |
| 5,461,910 A | * | 10/1995 | Hodson ................ G01F 1/7084 |
| | | | 73/170.12 |
| 5,522,261 A | | 6/1996 | Grover et al. |
| 5,589,643 A | * | 12/1996 | Pyle ...................... G01L 13/00 |
| | | | 73/756 |
| 5,661,461 A | | 8/1997 | Wiseman |
| 5,787,919 A | | 8/1998 | Pyle |
| 5,798,697 A | | 8/1998 | Wiseman |
| 5,981,877 A | | 11/1999 | Sakata et al. |
| 6,477,896 B1 | | 11/2002 | Nyberg |
| 6,506,974 B2 | | 1/2003 | Nakata |
| 6,569,219 B1 | | 5/2003 | Connor et al. |
| 7,891,311 B2 | | 2/2011 | Logan et al. |
| 8,003,014 B2 | | 8/2011 | Breay et al. |
| 8,910,516 B2 | | 12/2014 | Wiseman |
| 9,395,260 B2 | | 7/2016 | Pyle |
| 10,191,077 B2 | | 1/2019 | Wiseman |
| 10,571,482 B2 | | 2/2020 | Wiseman |
| 10,690,560 B2 | | 6/2020 | Wiseman |
| 10,942,197 B2 | | 3/2021 | Wiseman |
| 11,415,475 B2 | | 8/2022 | Wiseman |
| 11,415,477 B2 | | 8/2022 | Wiseman |
| 11,415,594 B2 | | 8/2022 | Wiseman |
| 11,423,918 B2 | | 8/2022 | Wiseman |
| 11,454,644 B2 | | 9/2022 | Wiseman |
| 2009/0301213 A1 | | 12/2009 | Barmettler et al. |
| 2011/0094294 A1 | | 4/2011 | Townsend et al. |
| 2014/0260594 A1 | | 9/2014 | Wiseman |
| 2015/0059464 A1 | | 3/2015 | Wiseman |
| 2017/0067929 A1 | | 3/2017 | Wiseman |
| 2018/0164174 A1 | * | 6/2018 | Wiseman ................ G01C 9/02 |
| 2019/0154724 A1 | | 5/2019 | Wiseman |
| 2020/0158749 A1 | | 5/2020 | Wiseman |
| 2020/0278268 A1 | | 9/2020 | Wiseman |
| 2020/0378854 A1 | | 12/2020 | Wiseman |
| 2020/0379000 A1 | | 12/2020 | Wiseman |
| 2020/0379001 A1 | | 12/2020 | Wiseman |
| 2021/0215561 A1 | | 7/2021 | Wiseman |
| 2021/0239729 A1 | | 8/2021 | Wiseman |
| 2021/0247257 A1 | | 8/2021 | Wiseman |
| 2022/0244124 A1 | | 8/2022 | Wiseman |

FOREIGN PATENT DOCUMENTS

| | | |
|---|---|---|
| WO | WO 98/52050 A1 | 11/1998 |
| WO | WO 2014/150755 A1 | 9/2014 |
| WO | WO 2015/179516 A1 | 11/2015 |
| WO | WO 2018/098339 A1 | 5/2018 |
| WO | WO 2020/243512 A1 | 12/2020 |

OTHER PUBLICATIONS

International Search Report and Written Opinion for International Application No. PCT/US2020/056933, dated Mar. 2, 2021.

[No Author Listed] Preqator; From The Wayback Machine. Screenshots taken Oct. 5, 2021 at https://web.archive.org/web/20131126025813/http://preqatool.se/Preqatool/Preqator.html of Wayback Machine Capture for http://preqatool.se/Preqatool/Preqator.html dated Nov. 26, 2013, 3 pages.

[No Author Listed] Preqator; From The Wayback Machine. Screenshots taken Oct. 5, 2021 at https://web.archive.org/web/20161026213515/http://preqatool.se/Preqatool/Preqator.html of Wayback Machine Capture for http://preqatool.se/Preqatool/Preqator.html dated Oct. 26, 2016, 3 pages.

[No Author Listed] Preqator; www.preqatool.se/Preqatool/Preqator.html. Screenshots taken Oct. 5, 2021, 3 pages.

[No Author Listed] Preqator-Original; www.preqatool.se/Preqatool/Preqator-Original.html. Screenshots taken Oct. 5, 2021, 3 pages.

[No Author Listed] Preqator-med hållare; www.preqatool.se/Preqatool/Preqator-med_hallare.html; Screenshots taken Oct. 5, 2021, 6 pages.

[No Author Listed] Preqator-med Hållare (alt. 1); http://preqatool.se/Preqatool/Preqator-_med_2_Hallare_(alt_1).html. Screenshots taken Oct. 5, 2021, 2 pages.

[No Author Listed] Preqator-med Hållare (alt. 2); http://preqatool.se/Preqatool/Preqator_-_med_2_Hallare_alt._2).html. Screenshots taken Oct. 5, 2021, 2 pages.

[No Author Listed] Bestsålling; http://preqatool.se/Preqatool/BESTALLNING.html. Screenshots taken Oct. 5, 2021, 2 pages.

[No Author Listed] Preqator; www.preqatool.se/Preqatool/Preqator.html. Webpage printed Oct. 9, 2020, 3 pages.

[No Author Listed] Preqator-Original; www.preqatool.se/Preqatool/Preqator-Original.html. Webpage printed Oct. 9, 2020, 3 pages.

[No Author Listed] Preqator-med hållare; www.preqatool.se/Preqatool/Preqator-med_hallare.html. Webpage printed Oct. 9, 2020, 4 pages.

[No Author Listed] Preqator-med Hållare (alt. 1); http://preqatool.se/Preqatool/Preqator-_med_2_Hallare_(alt_1).html. Webpage printed Oct. 9, 2020, 2 pages.

[No Author Listed] Preqator-med Hållare (alt. 2); http://preqatool.se/Preqatool/Preqator_-_med_2_Hallare_alt._2).html. Webpage printed Oct. 9, 2020, 2 pages.

U.S. Appl. No. 17/171,930, filed Feb. 9, 2021, Wiseman.
U.S. Appl. No. 17/700,032, filed Mar. 21, 2022, Wiseman.
U.S. Appl. No. 16/752,188, filed Jan. 24, 2020, Wiseman.
U.S. Appl. No. 16/878,555, filed May 19, 2020, Wiseman.
U.S. Appl. No. 16/426,974, filed May 30, 2019, Wiseman.
U.S. Appl. No. 16/427,083, filed May 30, 2019, Wiseman.
U.S. Appl. No. 16/427,153, filed May 30, 2019, Wiseman.
U.S. Appl. No. 17/073,294, filed Oct. 17, 2020, Wiseman.
U.S. Appl. No. 17/078,041, filed Oct. 22, 2020, Wiseman.
PCT/US2020/056933, Dec. 9, 2020, Invitation to Pay Additional Fees.
PCT/US2020/056933, Mar. 2, 2021, International Search Report and Written Opinion.

* cited by examiner

DIRECTIONAL DIFFERENTIAL PRESSURE DETECTOR

RELATED APPLICATIONS

This application is a continuation of U.S. application Ser. No. 17/078,041, filed Oct. 22, 2020, which claims the benefit of priority under 35 U.S.C. § 119(e) of U.S. Application Ser. No. 62/924,679, filed Oct. 22, 2019. The entire contents of these applications are incorporated herein by reference in their entirety.

FIELD

Disclosed embodiments relate to methods and apparatuses for detecting the presence of a directional differential pressure.

DISCUSSION OF THE RELATED ART

Various applications within hospitals, laboratories, pharmaceutical facilities, clean room facilities, etc., often require a particular direction of air flow or differential pressure to be maintained, such as between neighboring rooms, compartments, corridors, ducts, or other spaces. The pressure of a room relative to adjacent space(s) will determine the net direction of air flow through an opening into or out of the room.

For example, a hospital operating room may be kept under a positive pressure so that air flows out of the room, thereby preventing unfiltered or contaminated air from entering the room from adjacent spaces. This positive pressure is accomplished by supplying clean air to the operating room at a greater flow rate than the flow rate at which air is exhausted from the room by the room's ventilation system.

Or, if a hospital patient is infected with an airborne communicable pathogen, a patient isolation room may be kept under a negative pressure which is accomplished when the rate at which potentially contaminated air is exhausted from the room is greater than the rate at which air is supplied to the room from the room's ventilation system. Such a negative pressure arrangement, where the room is under a comparatively lower pressure than its immediate surroundings, prevents potentially contaminated air from exiting the room and escaping into surrounding space(s).

The net differential pressure between rooms will cause air to flow through an opening from one room to the other in the direction from a higher pressure to a lower pressure. The desired degree of differential pressure to be maintained between rooms, compartments, corridors, etc. will vary, depending on the application.

Accordingly, it is often desirable to closely monitor the general direction of potential or actual air flow between compartments and in some cases the particular magnitude of differential pressure causing the net air flow.

SUMMARY

According to one embodiment, a device for indicating a presence of a directional differential pressure between a first space and a second space separated from the first space by a barrier is disclosed. The device includes a baseplate configured to mount the device to a first side of the barrier, and a first conduit portion configured to be in fluidic connection with the first space, the first conduit portion being configured to reach an opening in the first side of the barrier. At a location where the first conduit portion is configured to reach the first side of the barrier, an imaginary axis passes through a center of the first conduit portion, the imaginary axis being perpendicular to the baseplate. The device also includes a second conduit portion configured to be fluidically connected to the first conduit portion and the second space, where the second conduit portion is inclined at an angle relative to a horizontal plane when the baseplate is oriented vertically. The second conduit portion includes a movable element travel path section within which a movable element can travel, and the movable element travel path section has a longitudinal direction which is transverse to the imaginary axis. The device also includes a movable element disposed within the movable element travel path section and movable from a first, vertically lower region of the second conduit portion to a second, vertically higher region of the second conduit portion in response to the directional differential pressure between the first and second spaces being greater than a threshold differential pressure. The movable element travel path section has a first movable element stop and a second movable element stop, and the imaginary axis intersects the movable element travel path section at a location between the first movable element stop and the second movable element stop, and the imaginary axis does not intersect either of the first movable element stop and the second movable element stop.

According to another embodiment, a device for indicating a presence of a directional differential pressure between a first space and a second space separated from the first space by a barrier is disclosed. The device includes a baseplate configured to mount the device to a first side of the barrier, and a first conduit portion configured to be in fluidic connection with the first space, the first conduit portion being configured to reach an exterior opening in the first side of the barrier. At a location where the first conduit portion is configured to reach the first side of the barrier, an imaginary plane passes through a center of the first conduit portion, the imaginary plane being perpendicular to the baseplate. The device also includes a second conduit portion configured to be fluidically connected to the first conduit portion and the second space, where the second conduit portion is inclined at an angle relative to a horizontal plane when the baseplate is oriented vertically. The second conduit portion includes a movable element travel path section within which a movable element can travel, and the movable element travel path section has a longitudinal direction which is transverse to the imaginary plane. The device also includes a movable element disposed within the movable element travel path section and movable from a first, vertically lower region of the second conduit portion to a second, vertically higher region of the second conduit portion in response to the directional differential pressure between the first and second spaces being greater than a threshold differential pressure. The movable element travel path section has a first movable element stop and a second movable element stop, the first and second movable element stops being configured such that when the movable element is in contact with the first movable element stop, at least a portion of the movable element is positioned to a first side of the imaginary plane, and when the movable element is in contact with the second movable element stop, at least a portion the movable element is positioned to a second side of the imaginary plane, opposite to the first side of the imaginary vertical plane.

According to a further embodiment, a device for indicating a presence of a directional differential pressure between a first space and a second space separated from the first space by a barrier is disclosed. The device includes a baseplate and a first inclined conduit connected to the baseplate and configured to be fluidically connected to the first and second spaces. The first inclined conduit is connected to the baseplate with a first mounting portion, and the first inclined conduit is inclined at a first angle relative to a horizontal plane when the baseplate is oriented vertically. The first mounting portion is removable from the baseplate without damaging the baseplate or the first mounting portion. At least one movable element is disposed within the first inclined conduit and movable from a first, vertically lower region of the first inclined conduit to a second, vertically higher region of the first inclined conduit in response to the directional differential pressure between the first and second spaces being greater than a threshold differential pressure. The device also includes a second mounting portion. When the first mounting portion is removed from the baseplate and the second mounting portion is connected to the baseplate, the second mounting portion is configured to hold an inclined conduit at a second angle, different from the first angle, relative to the horizontal plane when the baseplate is oriented vertically.

According to a further embodiment, a device for indicating a presence of a directional differential pressure between a first space and a second space separated from the first space by a barrier is disclosed. The device includes a baseplate and an inclined conduit connected to the baseplate and configured to be fluidically connected to the first and second spaces. The inclined conduit is inclined at an angle relative to a horizontal plane when the baseplate is oriented vertically. The device also includes a mounting portion which supports the inclined conduit, where the mounting portion is connected to the baseplate. The mounting portion includes a first locator, the baseplate includes a complementary second locator, and the first locator is configured to engage with the second locator to secure and orient the mounting portion at a desired roll orientation relative to the baseplate. Whenever the baseplate is secured to the barrier such that the baseplate is not rotatable relative to the barrier, and the mounting portion is secured to the baseplate, the angle of the inclined conduit relative to the horizontal plane is not adjustable without removing the mounting portion from the baseplate. The device also includes at least one movable element disposed within the inclined conduit and movable from a first, vertically lower region of the inclined conduit to a second, vertically higher region of the inclined conduit in response to the directional differential pressure between the first and second spaces being greater than a threshold differential pressure.

According to a further embodiment, device for indicating a presence of a directional differential pressure between a first space and a second space separated from the first space by a barrier is disclosed. The device includes a baseplate configured to be secured to the barrier such that the baseplate is not rotatable relative to the barrier, and an inclined conduit connected to the baseplate and configured to be fluidically connected to the first and second spaces. The inclined conduit is inclined at an angle relative to a horizontal plane when the baseplate is oriented vertically. While the baseplate is secured to the barrier such that the baseplate is not rotatable relative to the barrier, the angle of the inclined relative to the horizontal plane is not adjustable. The baseplate includes a plurality of baseplate mounting component sets configured to be aligned with a set of barrier mounting components. The baseplate mounting component sets are arranged such that the baseplate is securable to the barrier in a first roll orientation by aligning a first set of baseplate mounting components of the plurality of baseplate mounting component sets with a first barrier mounting component set, and securing the baseplate to the barrier using the first set of baseplate mounting components and the first set of barrier mounting components. The baseplate mounting component sets are arranged such that the baseplate is securable to the barrier in a second roll orientation, different from the first roll orientation, by aligning the first barrier mounting component set with a second baseplate mounting component set other than the first baseplate mounting component set, and securing the baseplate to the barrier using the first set of barrier mounting components and the second set of baseplate mounting components. The device also includes a roll indicator configured to indicate a threshold differential pressure set point when the baseplate is secured to the barrier in the first roll orientation and when the baseplate is secured to the barrier in the second roll orientation. At least one movable element is disposed within the inclined conduit and movable from a first, vertically lower region of the inclined conduit to a second, vertically higher region of the inclined conduit in response to the directional differential pressure between the first and second spaces being greater than a threshold differential pressure.

According to a further embodiment. a device for indicating a presence of a directional differential pressure between a first space and a second space separated from the first space by a barrier is disclosed. The device includes a rotatable base configured to be rotatably attached to the barrier, and an inclined conduit coupled to the rotatable base. When the rotatable base is rotated, an inclination of the inclination conduit is adjusted relative to a horizontal plane. The inclined conduit has a longitudinal direction which is transverse to the rotatable base. The device also includes at least one movable element disposed within the inclined conduit and movable from a first, vertically lower region of the first conduit to a second, vertically higher region of the first conduit in response to the directional differential pressure between the first and second spaces being greater than a threshold differential pressure. The device also includes a differential pressure set point indicator fixed to the rotatable base, where the differential pressure set point indicator includes a vial shaped in an arc and at least one movable marker disposed in the vial.

According to a further embodiment, a device for indicating a presence of a directional differential pressure between a first space and a second space separated from the first space by a barrier is disclosed. The device includes a baseplate configured to mount the device to the barrier, and a pivotable conduit connected to the baseplate and configured to be fluidically connected to the first space and the second space, where the pivotable conduit is pivotable about a pivot axis to be inclined at a plurality of angles relative to a horizontal plane. The device also includes a ball disposed within the pivotable conduit and movable from a first, vertically lower region of the pivotable conduit to a second, vertically higher region of the pivotable conduit in response to the directional differential pressure between the first and second spaces being greater than a threshold differential pressure. The pivotable conduit includes a travel path for the ball, with a proximal end of the travel path being located at a first ball stop and a distal end of the travel path being located at a second ball stop. The first ball stop is positioned such that the ball intersects a longitudinal direction of the pivot axis when the ball is contacting the first ball stop, and the pivotable conduit is parallel to the barrier when the device is mounted to the barrier.

According to one embodiment, a device for indicating a presence of a directional differential pressure between a first space and a second space separated from the first space by a barrier is disclosed. The device includes a baseplate configured to mount the device to the barrier. A first conduit portion is configured to be in fluidic connection with the first space, where the first conduit portion is oriented to have a longitudinal direction which extends transversely to the barrier. A second conduit portion is configured to be fluidically connected to the first conduit portion and the second space, where the second conduit portion is inclined at an angle relative to a horizontal plane when the baseplate is oriented vertically, and the second conduit has a longitudinal direction which is transverse to the first conduit portion longitudinal direction. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure. The second conduit portion forms a fluidic connection path which enters the second conduit in a direction transverse to a longitudinal direction of the second conduit, turns and travels in a direction away from the first conduit portion longitudinal direction, then turns and travels in a direction toward the first conduit portion longitudinal direction, passes the first conduit portion longitudinal direction, and travels away from the first conduit portion longitudinal direction toward an exit from the second conduit portion.

According to one embodiment, a device is provided for indicating a presence of a directional differential pressure between a first space and a second space separated from the first space by a barrier. The device includes a first conduit portion and a second conduit portion. The second conduit portion is fluidly connected to the first conduit portion and attached to a baseplate which is mountable to the barrier. The second conduit portion is inclined relative to the first conduit portion, and any rotation of the second conduit portion requires rotation of the baseplate. A roll orientation of the second conduit portion relative to the base is fixed. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure.

According to another embodiments, a device is provided for indicating a presence of a directional differential pressure between a first space and a second space separated from the first space by a barrier. The device includes a first conduit portion and a second conduit portion. The device further includes a mounting portion separated from the first conduit portion and configured to be connected to the first conduit portion such that the second conduit portion is fluidly connected to the first conduit portion. At least one movable element disposed within the second conduit portion and movable from a first, vertically lower region of the second conduit portion to a second, vertically higher region of the second conduit portion in response to the directional differential pressure between the first and second spaces being greater than a threshold differential pressure. Once the mounting portion is connected to the first conduit portion, the mounting portion is not rotatable relative to the first conduit portion.

According to another embodiment, a device is provided for indicating a presence of a directional differential pressure between a first space and a second space separated from the first space by a barrier. The device includes a first conduit portion having a longitudinal axis, and a second conduit portion fluidly connected to the first conduit portion. At least one movable element disposed within the second conduit portion and movable from a first, vertically lower region of the second conduit portion to a second, vertically higher region of the second conduit portion in response to the directional differential pressure between the first and second spaces being greater than a threshold differential pressure. The second conduit portion has a travel path for the movable element, wherein the travel path extends transversely to an extension of the first conduit portion longitudinal axis and extends beyond the extension of the first conduit portion longitudinal axis in two opposite directions.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF DRAWINGS

The accompanying drawings are not intended to be drawn to scale. In the drawings, some identical or nearly identical components that are illustrated in various figures are represented by a like numeral. Various embodiments of the present disclosure will now be described, by way of example, with reference to the accompanying drawings. The embodiments and drawings shown are not intended to narrowly define the present disclosure. In the drawings.

DETAILED DESCRIPTION

Figure 1:
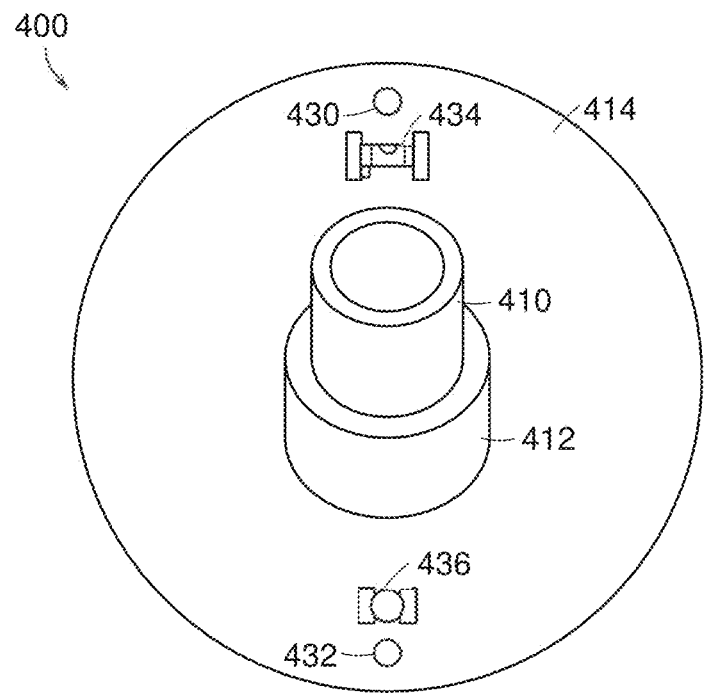
FIG. 1 is a front view of one embodiment of a device for indicating a directional differential pressure, the device being installed in a first orientation.
Figure 2:
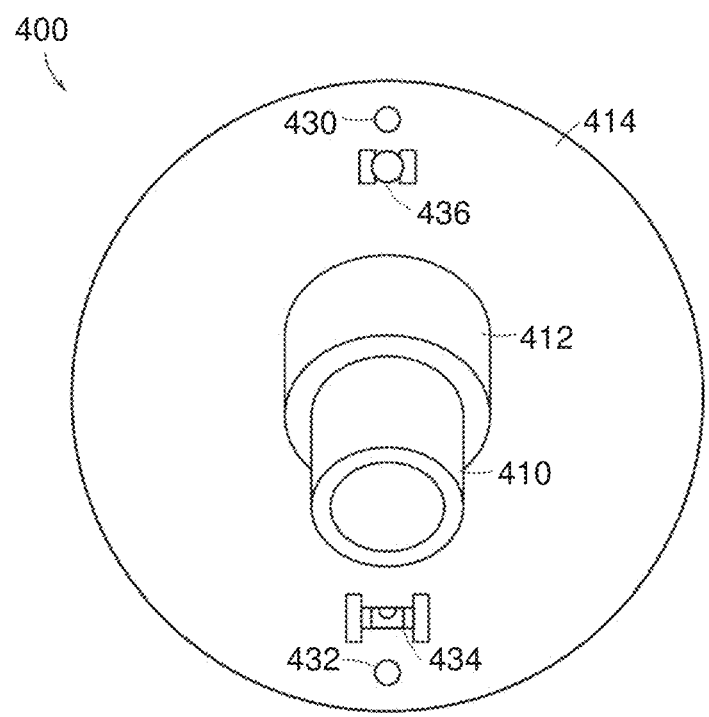
FIG. 2 is a front view of the embodiment of FIG. 1 with the device installed in a second orientation.

The present disclosure relates to devices and systems which provide an indication of potential or actual directional air flow and/or whether a particular degree of directional differential pressure exists between spaces (e.g., two neighboring rooms or a room and an adjacent corridor) separated by a barrier such as a wall. In some embodiments, the device includes a first component located on a first side of a barrier, and a second component located on a second side of the barrier such that each component is subject to the air pressure within its respective space. The overall device is adapted to react to pressure differences between the two spaces to provide an indication to a viewer of the device. In some embodiments, the device may include sensors which communicate a status to a remote device, such as an alarm.

An air flow conduit may extend from one space to another space (e.g., room to hallway or hallway to a room that is separated by an anteroom between them). According to some embodiments, a visual indicator such as a lightweight ball or other movable element moves within the conduit in response to differences in air pressures between the two spaces. For example, in some embodiments, the air pressure in a room may be higher than in an adjacent hallway, and if the difference surpasses a threshold pressure, the movable element may move toward an end of the conduit to indicate the pressure difference exceeding the threshold.

An air flow conduit does not necessarily require that the conduit be arranged to permit air to be transferred from one space to another. Instead, the pressures on opposite sides of a wall may communicate without air flow moving all the way through the air flow conduit. For example, a conduit may pass from a hallway to a room, and a piston may be positioned with within the conduit. If pressure in the room is sufficiently higher than in the hallway to surpass a threshold pressure differential, the piston may move toward the hallway and be visible within the conduit in the hallway. If the piston is sealed within the interior of the conduit, no room air escapes into the hallway space, though a small amount of air flows behind the piston within the conduit. In this manner, the air flow conduit may provide a fluidic connection between two spaces where some minor air flow occurs within the conduit, yet no air is transmitted from one space to the other.

As discussed further below, in other embodiments, the fluidic connection may allow air to be transmitted between two spaces until a ball seats against an end of a conduit. In still further embodiments, air flows from one space to another even when a ball (or other movable element) reaches the end of its travel path. For purposes herein, when a first component is described as being fluidically connected to a space or to a second component, intermediate components may be present as part of the fluidic connection.

In some embodiments, a device for indicating a differential pressure between two spaces includes one or more conduits in communication with the air in both spaces such that a movable element disposed in the conduit(s) can react to directional air flow caused by the differential pressure. As described further herein, the conduit(s) may extend through the wall, or reside predominantly on one side of the wall, and adjustability of the incline of portions of the device may reside on a single side of the wall in some embodiments. The movable element (e.g., at least one ball) is disposed within a passageway of the conduit and moves freely back and forth along at least a portion of the length of the conduit. Restraints or end stops may be located at the ends or at other areas of the conduit to contain the ball within the conduit. The end stops may have openings that allow fluid (e.g., air, gas, liquid, water vapor, etc.) to flow through the passageway of the conduit from one end to an opposite end.

Systems are available for detecting whether a differential pressure between two spaces (e.g., between a clean room and an adjacent corridor) is above a threshold pressure difference. In some conventional systems, an inclined single conduit passes from one space to another through a wall, and a movable ball is placed in the conduit. On one side of the wall, for example the clean room side, the conduit has a lower region inside of the clean room and a higher region in the corridor. Gravity pulls the ball toward the lower region of the conduit. As the pressure in the clean room is raised higher than the corridor pressure, air pressure and/or air flow apply forces against the ball. Once the pressure difference between the clean room and the corridor reaches a threshold level, the force of the air against the ball overcomes the force of gravity, and the ball moves to a higher region of the conduit. By observing the presence of the ball in the higher region, a user can quickly see that the pressure difference between the two spaces equals or exceeds the desired directional differential pressure threshold level. To change the threshold pressure difference set point, the angle of inclination of the conduit is adjusted such that the amount of gravitational force on the ball in the direction of the conduit is adjusted. That is, in some embodiments, a greater incline of the conduit in which the ball travels requires a greater pressure differential between the two rooms to overcome gravity and move the ball from a lower to a higher region.

According to some embodiments of the present disclosure, a device is provided which provides for ease of installation. For example, in some embodiments, a differential pressure detector is arranged such that once the device is mounted to a barrier (e.g., a wall), an angle of inclination of a conduit portion is not adjustable. Further, the device may include a pitch indicator and/or a roll indicator to aid the installer in confirming the proper angle of inclination. In this manner, if a specific threshold pressure differential set point is desired, a simplified device can be installed with a conduit portion inclined such that the threshold pressure is set to the desired set point. In some embodiments, no further actions are required of the user, and potentially unwanted changes to the set point can be inhibited. For example, tampering with the set point may be discouraged with such an arrangement.

According to some embodiments, the combination of a roll indicator and a pitch indicator with a non-adjustable inclined conduit provides an arrangement which permits the installer and/or user to confirm that the device is set at a desired threshold pressure set point. For example, in such an arrangement, an installer can orient the baseplate until the roll indicator shows that the baseplate is at the desired roll orientation. The pitch indicator then may be used to confirm that the pitch of the inclined conduit is at the desired angle. With the roll at the desired orientation, the pitch indicator is useable to confirm the pitch of the inclined conduit. If the roll indicator were not present, and the roll orientation were not confirmed, the pitch indicator may not work in some embodiments. Or, in some embodiments, the pitch indicator may falsely indicate a correct pitch of the inclined conduit if the roll orientation is not actually at the desired orientation. In this manner, the combination of the roll indicator, pitch indicator, and non-adjustable incline conduit provides a device which may be correctly set to a threshold pressure set point without the need for extra equipment and/or burdensome calibration procedures.

According to some embodiments of the present disclosure, a viewer of the detector is able to check whether the device is calibrated. An out-of-calibration detector may result in the detector indicating a pressure differential which is not actually present, and the actual pressure differential may not meet minimum infection control or contamination standards. Applicant has recognized that it can be advantageous to have the detector arranged such that calibration can be performed using components which form part of the device such that external calibration instruments and/or procedures may be avoided in some embodiments.

Some embodiments of the device may be tamper-resistant in that once the device is installed, the inclination of the conduit portion which houses the movable element cannot be changed. Further, when installing the device in some embodiments, mounting the conduit portion at an incorrect inclination angle may be revealed by the pitch indicator and/or the roll indicator.

According to some embodiments, the above-described feature is provided by arranging a device to have a first conduit portion which is configured to pass through a wall, and a second conduit portion which is angled relative to the first conduit portion. The first and second conduit portions may be fixed to each other in such a manner (e.g., integrally formed) such that rotation of one portion rotates the other portion. In this manner, if the first portion is fixed to the wall such that the first portion cannot rotate, the inclination of the second portion relative to a horizontal plane remains fixed. For purposes herein, references to a "horizontal plane" refer to a plane which is perpendicular to the direction of the force of gravity. "Vertical plane" refers to a plane which is parallel to the direction of the force of gravity.

According to some embodiments, a conduit portion, within which a movable element travels, is inclined relative to the horizontal plane when the pitch indicator indicates that the device is at a desired pitch. For example, the pitch indicator may be a level, and when the level shows that the level is horizontal, the conduit potion may be inclined relative to the horizontal plane.

When mounting the device to a barrier, a baseplate may be used. If a barrier is not fully vertical, the baseplate may be shimmed or otherwise adjusted to orient the baseplate vertically. According to some embodiments, when the baseplate is oriented vertically, the conduit which holds the movable element is inclined relative to a horizontal plane. For purposes herein, a baseplate may be considered to be oriented vertically when its barrier-contacting surface has an orientation that the baseplate would have if it were to be placed against and secured to a smooth, vertical surface. That is, when referencing a "vertically oriented baseplate", the orientation of the baseplate would be the same as when the baseplate is placed against and secured to a smooth, vertical surface. Referencing a vertically oriented baseplate to explain the inclination or orientation of another component does not require a baseplate to be vertically oriented or to be secured to a vertical barrier.

In some embodiments, a device is provided which can be installed to have a certain threshold pressure differential set point selected from among a discrete number of set points. For example, the device may have a choice of mounting holes in a baseplate such that the device is mountable to a wall at different roll angles. In such a device, once mounted, the device provides a certain threshold set point that is not adjustable without first at least removing the baseplate from the wall.

Turning to the figures, FIGS. 1-4 shows one embodiment of a device 400 configured to be installed in either of two orientations. Device 400 includes a first conduit portion 402 which is configured to pass through at least a portion of a barrier 404. A first end 406 of the first conduit portion 402 is attached to a first conduit support 408, which in this embodiment is a cylinder with an internal diameter that accepts the external diameter of the first conduit portion.

A second conduit portion 410 is attached to a second conduit support 412, which in this embodiment is a cylinder with an internal diameter that accepts the external diameter of the second conduit portion. The first and second conduit supports, 408, 412 are shown as being integrally formed with a baseplate 414, though in other embodiments, one or both of the conduit supports may be separately formed and then attached to the baseplate 414.

Second conduit portion 410 has a longitudinal axis 416 which is angled relative to a longitudinal axis 417 of first conduit support 408. Longitudinal axis 417 may be coextensive with a longitudinal axis 418 of the first conduit portion 402. With the first conduit support longitudinal axis 408 being horizontal in the illustrated embodiment, the longitudinal axis 416 of the second portion is inclined relative to a horizontal plane. Accordingly, in the orientation shown in FIGS. 1 and 3, to move a ball 420 (or other movable element) upwardly within the second conduit portion, the space on the right hand side of the barrier 404 will need to have a pressure that is higher than the pressure on the left hand side of the barrier. Additionally, to move the ball, the pressure difference between the two spaces will have to provide enough force on the ball to overcome the gravitational force on the ball. In this manner, the weight of the ball, the diameter of the ball, the inner diameter of the second conduit portion, and the incline of the second conduit portion establish a threshold pressure differential.

Two mounting holes 430, 432 are provided on the baseplate 414 to aid in mounting the device to a wall or other barrier. In the illustrated embodiment, the mounting holes are positioned 180° apart from each other and positioned relative to the second conduit such that the second conduit is pitched at the maximum angle relative a horizontal plane when the mounting holes are aligned vertically. Such an arrangement can ease installation by not requiring measurements or calibrations to be performed beyond confirming a suitable roll orientation and confirming that the device is plumb.

The illustrated embodiment may be installed in either of two orientations when the mounting holes are vertically aligned. In this manner, the device may be used to indicate positive pressure when mounted in a first orientation, or to indicate negative pressure when mounted in a second orientation. Other orientations are possible if the mounting holes are rotated to be not vertically aligned. However, installation procedures can be set forth in a straightforward manner to achieve a desired set point by manufacturing a device with second conduit portion which does not change in angle relative to the first conduit portion, and instructing the installer to align the mounting holes vertically using the on-board roll indicator.

In some embodiments, to maintain a constant angle between longitudinal axis 416 of second conduit portion 410 and longitudinal axis 417 of first conduit support 408, conduit supports 412 and 408 are connected such that the supports are fixed relative to each other from an orientation standpoint. Conduit support 412 cannot be rotated relative to conduit support 408 in the illustrated embodiment. In this manner, once conduit support 412 is fixed to the wall via baseplate 414, the angle of inclination is set and not adjustable without removing the baseplate.

In the illustrated embodiment, longitudinal axes 417 and 418 are horizontal, though in some embodiments, one or both of longitudinal axes 417 and 418 may be non-horizontal. Having longitudinal axis 418 be horizontal helps permit baseplate 414 to be oriented in either of two orientations that are 180° opposite to each other in a manner which allows second conduit portion 410 to have either of two opposite angles (e.g., +5° or −5°, or +15° and −15°).

According to some embodiments, the device includes a first level 434 and a second level 436 which are disposed on the baseplate 414 and are used to assist in mounting the rotatable base to a first side of the barrier to confirm that the second conduit portion is inclined at the correct angle. The second level 436 may be arranged in a direction transverse to the first side 10 of the barrier and may be configured to indicate whether the baseplate 414 is aligned with a vertical plane. When the baseplate is secured to the barrier, the second level also may indicate whether the barrier is out of plumb and not vertical. If the baseplate is not aligned with a vertical plane in the illustrated embodiment, the angle of inclination of the second conduit portion will not have the correct angle of inclination which establishes the threshold pressure differential set point.

An installer may set the correct threshold pressure set point by ensuring the second level 436 indicates alignment of a rear of the baseplate with a vertical plane. For example, if the wall is not plumb, the baseplate 414 may be shimmed or otherwise adjusted until the second level 436 shows that the device is correctly aligned. In one embodiment, the second level 436 may use an air bubble in liquid to indicate whether the device is oriented correctly, though other arrangements may be used.

In some embodiments, the second level may not need to be mounted to a baseplate surface. Instead, a different surface of the device may have second level 436 mounted thereon, and this different surface may be arranged such that when the surface is horizontal, the second conduit is set at a desired inclination with respect to the horizontal plane.

In some embodiments, the baseplate may not necessarily need to be aligned with a vertical plane to have the second conduit portion set to a correct angle. For example, the baseplate may be arranged to be oriented at an angle relative to a vertical plane, and other portions of the device may play a role in situating the device to a barrier. Second level 436 may still be used to indicate that a certain horizontal surface is horizontal to verify the desired inclination of the second conduit portion. By having a pitch indicator, such as second level 436, attached to the overall device, ease of installation may be facilitated, and the confirmation of pitch may be checked periodically.

The first level 434 is configured to allow an installer to see whether a roll orientation of the baseplate 414 on the barrier is correct, and therefore the first level is oriented perpendicularly to the second level 436. That is, the first level indicates when the baseplate is in a correct roll orientation relative to the barrier so that the roll orientation of the second conduit portion is at a desired orientation relative to a vertical plane. By incorporating a roll indicator on the device, ease of installation may be facilitated, and the roll orientation may be confirmed periodically.

A conduit cover 448 may be positioned over a second end 446 of the first conduit portion 402. The conduit cover may include a collar 444 configured to receive the second end of the first conduit portion, and may further include air passageways 442 to allow for the flow of air through the device.

In some cases, devices of exemplary embodiments described herein may include a fire stop system that, upon the detection of a threshold level of smoke or fire, provides a barrier that blocks or otherwise mitigates travel of the smoke/fire from one space or room to another. The fire stop system may include various components used to seal the passage within the wall. For example, the fire stop system may include a fire stop ring 450 located on each side of the barrier. In some embodiments, there may be a single fire stop ring. The fire stop ring may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer. Devices of exemplary embodiments herein may be employed in fire-rated or non-fire-rated applications, as the present disclosure is not so limited.

The second conduit 410 may be transparent so as allowing viewing of the moveable element 420. The second conduit support portion support 412 may be constructed with an opaque material so that the ball is not visible from the side of the device. In this manner, the presence or absence of the ball can be readily noticed to understand whether the threshold pressure differential is being met. The ball may be at least partially hidden or hidden by the support 412 from a side view of the conduit 410 and support 412.

By hiding or at least partially hiding the ball in the second conduit portion support (e.g. a collar), it is not necessary for the ball to enter the wall or pass through the wall for the ball to be hidden. Accordingly, the first conduit portion may have a smaller diameter than the ball, which may reduce the size of the penetration that is made through the wall to install the device. For example, the ball may have a diameter of 1.5 inches, and the second conduit portion may have an inside diameter slightly larger than the ball. The first conduit portion may have an inner diameter of one inch, or half an inch, or any other suitable inner diameter that is smaller than the diameter of the ball.

Figure 5A:
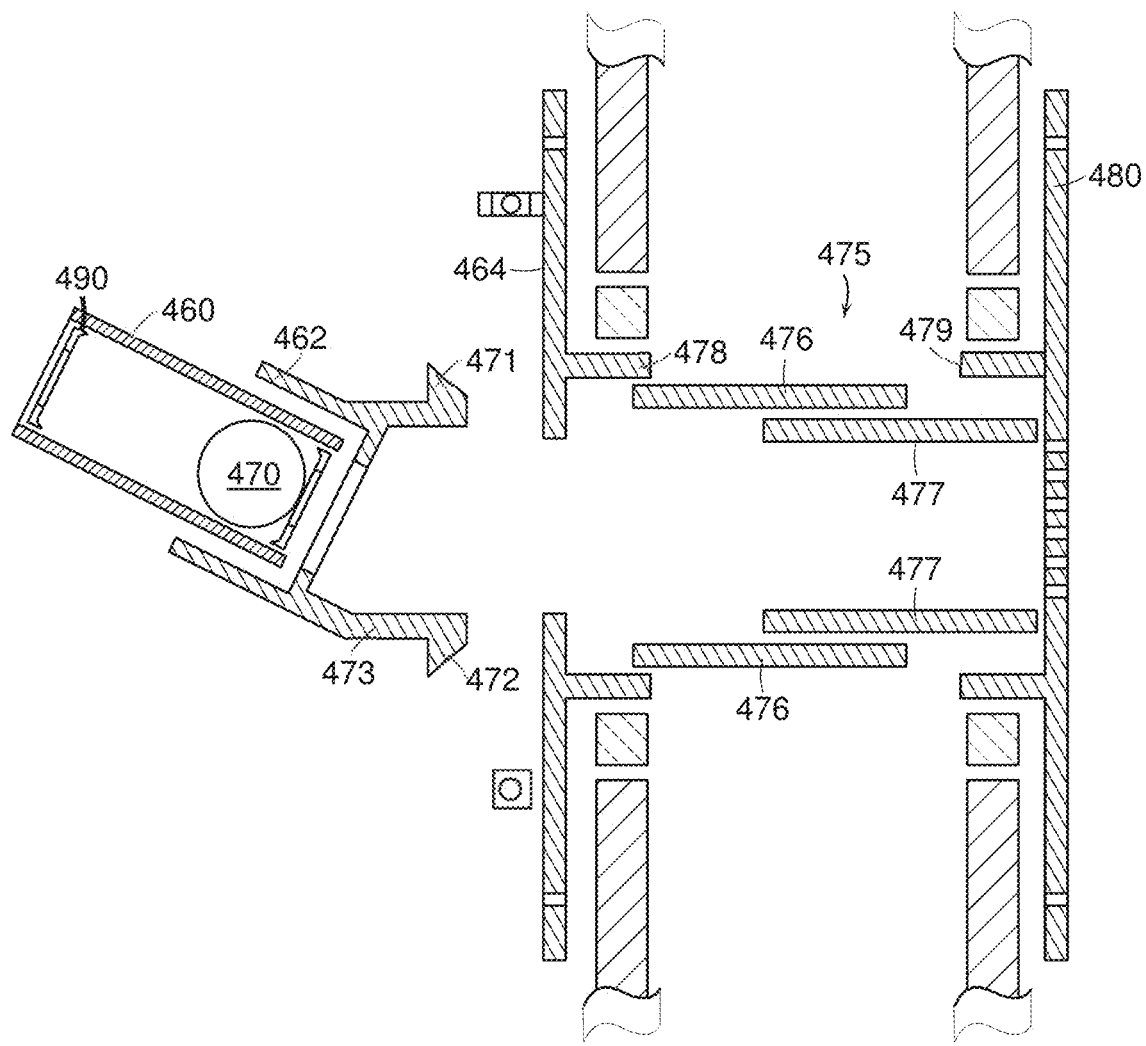
FIG. 5A is a cross-sectional side view according to an alternative embodiment.

The embodiment illustrated in FIG. 5A shows a second conduit portion 460 and a second conduit portion support 462 which are separable from a baseplate 464. The second conduit portion support 462 may include a mounting portion 473, which may be circular, with snap-fit connectors 471, 472 for attachment of the assembly to the baseplate 464. The baseplate may include notches configured to receive snap-fit connectors 471, 472 such that the second conduit portion assembly is attachable in the baseplate in only two orientations. In this manner, the second conduit portion assembly may be set at a positive incline or a negative. In other embodiments, the snap-fit connectors 471, 472 and the baseplate may be arranged such that the second conduit portion assembly can be attached to the baseplate in only one orientation. The interaction between the snap-fit connectors and the notches may prevent rotation of the second conduit portion assembly once the assembly is attached to the baseplate. In this manner, tampering or accidental movement of the second conduit portion may be inhibited.

The snap-fit connectors 471, 472 may act as locators to orient the mounting portion 473 in a desired roll orientation relative to the baseplate. The associated notches in the baseplate may serve as complementary locators on the baseplate to receive the locators which are positioned on the mounting portion 473. Other suitable locators may be used.

In some embodiments, conduit mounting portion 473 and baseplate 464 may be constructed such that the conduit mounting portion is removable from the baseplate without damaging the conduit mounting portion or the baseplate. For example, a user may squeeze the members holding snap-fit connectors 471, 472 toward one another to remove the conduit mounting portion from the baseplate. Such an arrangement may permit installation and/or removal of the conduit mounting portion without the use of a tool. In some embodiments, a tool may be used to attach and/or detach the conduit mounting portion to the baseplate.

In some embodiments, mounting portion 473 may have a geometry other than circular. For example, mounting portion may be square, thereby preventing rotation once the mounting portion is attached to the baseplate 464. In the case of a square, in some embodiments the second conduit portion may be mounted in one of four different roll orientations. In other embodiments, a triangle or other shapes may be used.

In some embodiments, the conduit mounting portion shown in FIG. 5A may be arranged to hold the inclined conduit such that the inclined conduit is parallel to the baseplate and/or barrier.

Figure 5B:
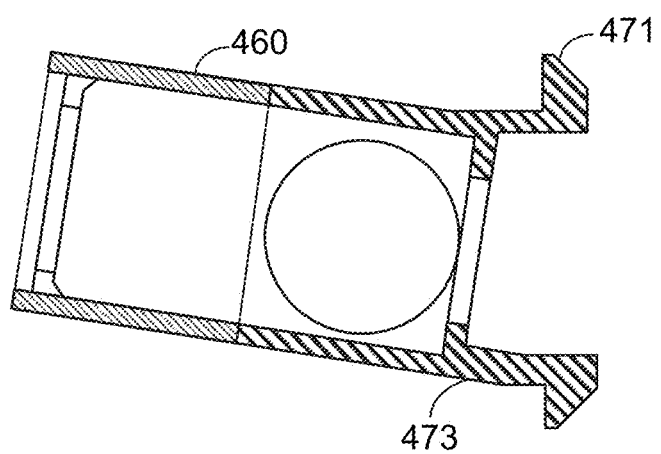
FIG. 5B is a cross-sectional side view of a conduit and conduit mounting portion which may be used with the device shown in FIG. 5A.

The embodiment illustrated in FIG. 5B shows a second conduit portion 460 and the mounting portion 473 as a single piece. In some embodiments, the second conduit portion 460 and the mounting portion 473 may be integrally formed. The mounting portion 473 of FIG. 5B may be configured to hold second conduit portion 460 at a different inclination relative to the horizontal plane when installed as compared to the second conduit portion shown in FIG. 5A. In this manner, a user may be able to swap mounting portions to attain a different angle of inclination. In some embodiments, the same second conduit portion may be used with both mounting portions. In some embodiments, a different second conduit portion may be used with each conduit mounting portion. A portion of the second conduit 460 in the embodiment of FIG. 5B may be opaque, while another portion may be transparent.

A telescoping first conduit portion 475 is also shown in FIG. 5A. Two pieces 476, 477 are slidable relative to one another to allow for adjustment in length. In some embodiments, once the two pieces 476, 477 and arranged to form a first conduit portion of a desired length, the pieces may be adhered to another and adhered to first and second collars 478, 479. In other embodiments, only some or none of the pieces may be permanently attached, and the mounting of baseplate 464 and conduit cover 480 to the barrier may serve to hold the conduit portion pieces 476, 477 in place.

The second conduit portion support 412 may be constructed with an opaque material so that the ball is not visible from the side of the device. In this manner, the presence or absence of the ball can be readily noticed to understand whether the threshold pressure differential is being met.

A ramp 490 may be positioned around the circumference of an inside of an end cap on second conduit portion 460 to aid in seating the ball 470 against a hole in the end cap. In this manner, the ball may seal (or reduce) air flow through the second conduit portion when the ball is pushed against the end cap. The ramp 490 may be positioned around the entire inner circumference of the second conduit portion, or the ramp may be present in select areas. For example, if the second conduit is rotatable only to certain roll angles, the ramp may only be present in certain arcs of the inner portion of the second conduit portion which correspond to where the ball will be traveling at those roll angles.

By hiding or at least partially hiding the ball in the second conduit portion support (e.g. a collar), it is not necessary for the ball to enter the wall or pass through the wall for the ball to be hidden. Accordingly, the first conduit portion may have a smaller (or larger) diameter than the ball, which, when smaller, may reduce the size of the penetration that is made through the wall to install the device. For example, the ball may have a diameter of 1.5 inches, and the second conduit portion may have an inside diameter slightly larger than the ball. The first conduit portion may have an inner diameter of one inch, or half an inch, or any other suitable inner diameter that is smaller than the diameter of the ball.

Figure 6:
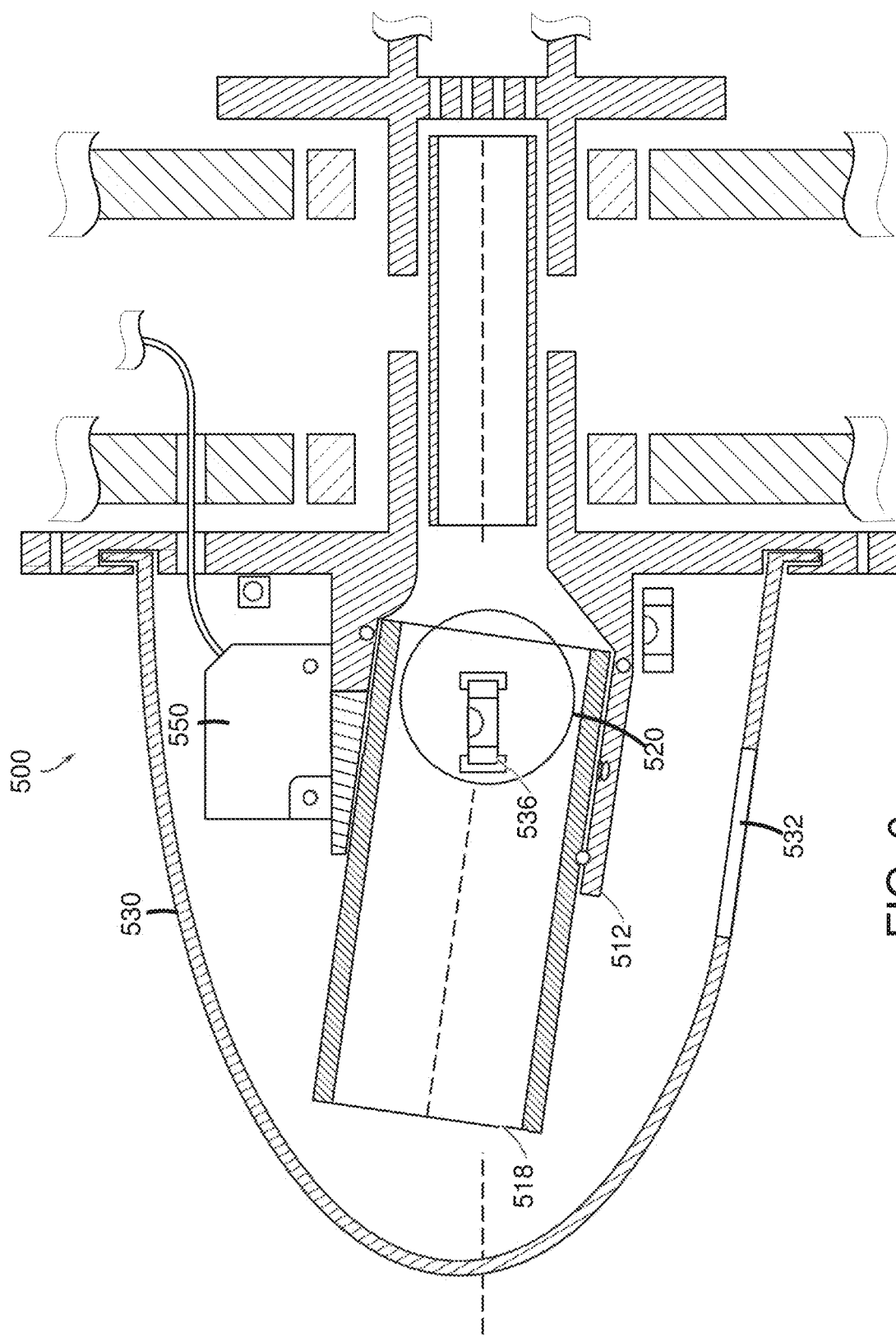
FIG. 6 is a cross-sectional side view of an alternative embodiment.

The embodiment illustrated in FIG. 6 includes device 500 which is similar to device 400 shown in FIGS. 1-4. A pitch level 536 is shown in an alternative position as compared to the embodiments of FIGS. 1-4. In this embodiment, the pitch level 536 is mounted on a side of a conduit support 512.

A detector such as a photoelectric sensor 550 may be employed to detect the presence and/or absence of the movable element, such as a ball 520. In the illustrated embodiment, when the ball returns to a lower vertical region, as shown in FIG. 6, thereby indicating the differential pressure that is below the threshold differential pressure, photoelectric sensor 550 detects the presence of the ball and sends a signal. The detector may transmit the signal to trigger an alarm or annunciator to alert someone that the differential pressure is below the threshold. In some systems, the detector may transmit a signal to a controller such as an HVAC controller or a building services controller.

As shown in FIG. 6, the device 500 also includes a transparent shield 530 which may be used to protect the second conduit portion and other components from unintentional contact while allowing the movable element to remain visible so that a differential pressure may be indicated. The shield includes an orifice 532 which allows air to pass from the first side of the barrier to the second conduit portion through an end stop 518. Accordingly, the shield does not interfere with the differential pressure based movement of a movable element in the second conduit portion. It should be noted that the shield may be omitted from the device 500 without a corresponding loss in functionality of the device and/or movable element disposed therein.

The embodiments shown in FIGS. 1-6 allow an installer to adjust the length of the device to conform to the thickness of the wall or other barrier when installing the device to a wall or other barrier. For example, the first conduit portion 402 may be telescoping or may be a continuous tube which is cut to size and then inserted into first conduit support 408 and collar 444 of the rear cover so that the device fits in a particular barrier. In prior devices with a single, straight conduit portion that penetrates through both sides of a wall and allows the ball to travel through the wall, the thickness of the wall would typically need to be known before manufacture of the device. Cutting can lead to particles entering the conduit, and therefore in prior devices, cutting a conduit that acts as a full passageway for the ball could lead to particles which obstruct the travel of the ball. In some embodiments disclosed herein, separate conduit portions are used, and the ball travels only in the one of the portions. The other portion (e.g., the portion that travels through the wall) can be cut and cleaned, and then attached to the conduit support without affecting the conduit portion through which the ball travels.

FIG. 6 shows an embodiment where a conduit portion traveling through at least a portion of the wall has a smaller diameter than the conduit portion which contains the movable ball 520.

Figure 7:
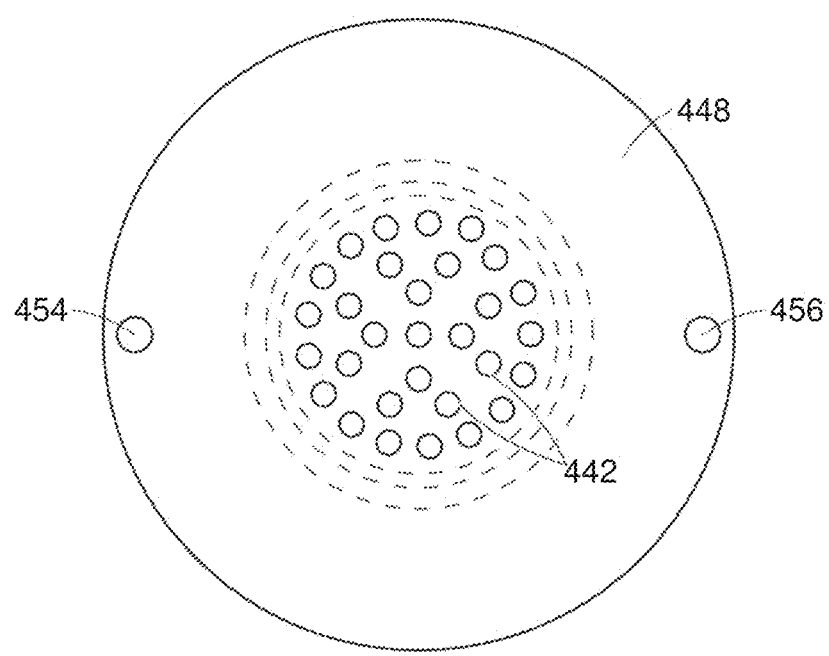
FIG. 7 is a rear view of the embodiment of FIG. 1.

FIG. 7 shows conduit cover 448 from a viewpoint toward the outside of the barrier to which the conduit cover is attached. The conduit cover includes their passageways 442, which may be sized and shaped in any suitable configuration. Mount holes 454, 456 may be included.

Figure 8:
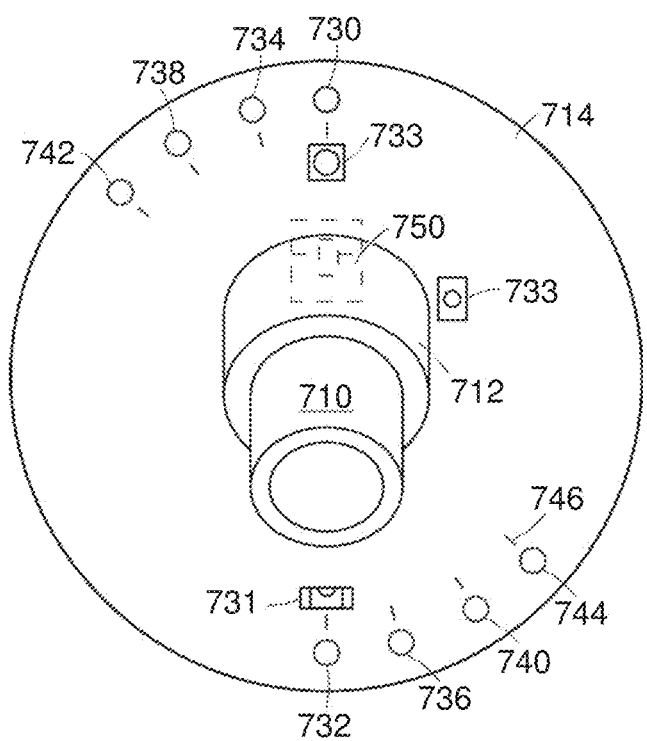
FIG. 8 is a front view of an alternative embodiment.

FIG. 8 shows an embodiment where a baseplate 714 is mountable in any one of four discrete roll orientations, although more or fewer discrete roll orientations may be used. A second conduit portion 710 remains fixed in its inclination once the baseplate 714 is secured to the wall. In this manner, different inclinations of the second conduit portion 710 are available to the installer. Accordingly, four different threshold pressure differentials are achievable with this single device. In the orientation illustrated in FIG. 8, the maximum downward inclination achievable with this particular embodiment is shown. Rotating the baseplate 714 clockwise to vertically align mounting holes 734 and 736 will rotate second conduit portion 710 clockwise and thereby decrease the downward angle of the second conduit portion. In this embodiment, the second conduit portion is not rotatable relative to the baseplate. As such, the threshold pressure is not adjustable unless the baseplate is uninstalled, repositioned, and reinstalled.

The embodiment illustrated in FIG. 8 includes four sets of baseplate mounting components: a first set including mounting holes 730, 732; a second set including mounting holes 734, 736; a third set including mounting holes 738, 740; and a fourth set including mounting holes 742, 744. While the sets of mounting holes shown in FIG. 8 include two mounting holes, a set may include at least two mounting holes, three or more mounting holes, or any suitable number of mounting holes.

A roll level 731 may be used to confirm that mounting holes 730, 732 are vertically aligned. Additional roll levels may be mounted on the baseplate adjacent to mounting holes 736, 740, and 744 so that vertical alignment of those mounting holes may be confirmed when the device is installed in the different roll orientations. Markings 746 indicating threshold pressure differentials associated with each orientation may be included directly on the baseplate. A pitch level 733 may be mounted to the baseplate and/or to a conduit support 712. A photoelectric detector 750 may be included to detect the presence and/or absence of a ball or other movable element within the second conduit portion.

Mounting holes 730, 734, 738, and 742 may all have a same radial distance from the center of the baseplate. Mounting holes 732, 736, 740, and 744 may all have a same radial distance from the center of the baseplate. Though the radial distance of mounting holes 732, 736, 740, and 744 may differ from the radial distance of mounting holes 730, 734, 738, and 742.

Figure 9:
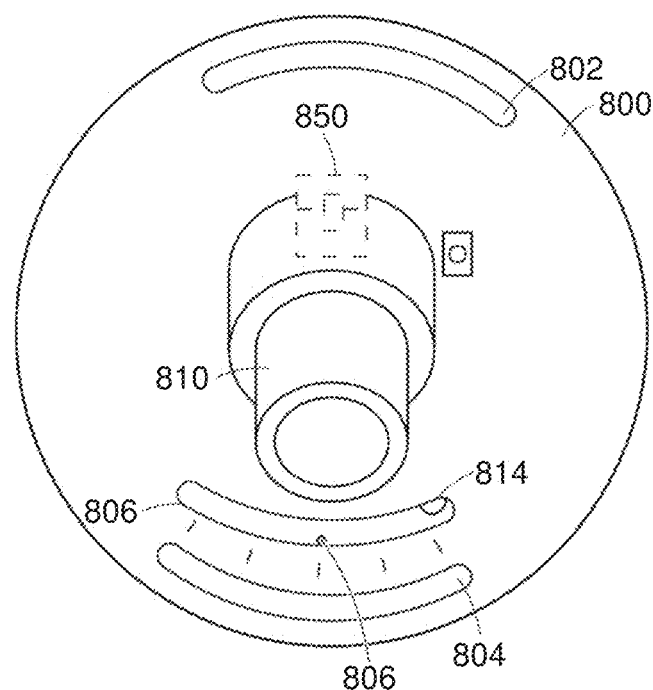
FIG. 9 is a front view of an alternative embodiment.

Other types of mounting components may be used as baseplate mounting components and/or barrier mounting components. For example, the baseplate may have resilient plugs which can be pushed into receptors adhered to the barrier FIG. 9 illustrates an alternative embodiment of a baseplate 800 in which instead of mounting holes, mounting slots 802, 804 are provided. In this manner the orientation of the baseplate continuously varied across a given range.

As with other embodiments disclosed herein, the roll orientation of the second conduit portion relative to the baseplate may be fixed. A vial 806 with a weighted ball 808, or a gas bubble 814 or other pointer may be included on the baseplate to indicate the threshold pressure differential set point associated with the installed roll orientation of the baseplate. For example, threshold pressure differential values may be marked along the length of vial 806. Other suitable markings may be used in other embodiments. Any suitable device may be used to indicate the roll angle and/or threshold pressure differential set point. For example, a device which responds to the force of gravity (e.g., bubble inclinometer, pendulum inclinometer, etc.) may be mounted to an appropriate portion of the baseplate so that an accurate determination can be made as to the actual degree of roll of the baseplate.

A photoelectric detector 850 or other detector may be used to sense the presence and/or absence of a movable element within a second conduit portion 810.

Figure 10:
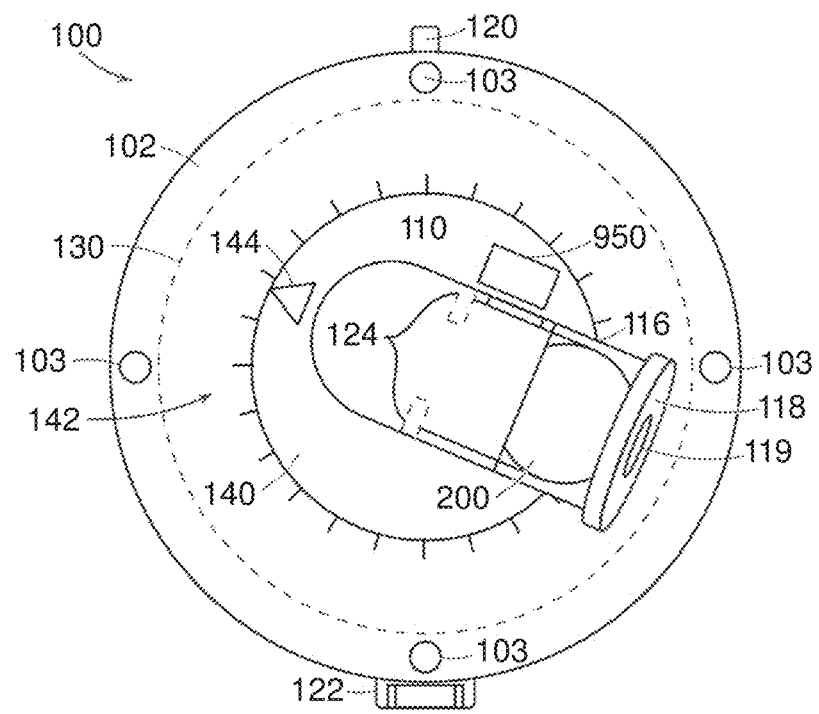
FIG. 10 is a front view of another alternative embodiment where a conduit portion is rotatable relative to a baseplate.

FIG. 10 is a front view of another embodiment of a device 100 for indicating a directional differential pressure. The embodiment of FIG. 10 is configured to indicate a threshold differential pressure set point based on the angle of inclination of a pivot arm 116 relative to a horizontal plane. That is, in the depicted embodiment, the pivot arm 110 includes a rotatable base 140 which rotates concurrently with the pivot arm. The rotatable base includes an arrow 144 which is aligned with an end of the pivot arm which is inclined as the pivot arm rotates. Pluralities of markings 142 are disposed on a baseplate 102 which is fixed to the wall. The markings are disposed around a circumference of the rotatable base in a predetermined interval and denote various angles of the pivot arm. The markings may correspond to threshold differential pressure set point values from a separate chart or may list threshold differential pressure set point values. Thus, during installation of the device, the pivot arm may be rotated to a position so that an appropriate differential pressure threshold may be set for a given space. The accuracy of the markings 142 may be affected by the alignment of the pivot arm axis of rotation with a horizontal plane, which may be indicated with a first level 120. Additionally, the accuracy may also be partly determined by the roll orientation of the rotatable base 102, the correct orientation of which is indicated by a second level 122. Together, the pitch indicator 120 and the roll indicator 122 may be used to calibrate the correct orientation of the device so the markings and pointer may be calibrated. A photoelectric detector 950 and/or other detector may be employed to detect the presence and/or absence of a ball 200 within pivot arm 116. Mounting holes 103 may be provided at any suitable locations to mount baseplate 102 to the wall. Shims may be used along with the plumb level 120 to set the base 102 plumb, and thus set a horizontal axis of rotation for pivot arm 110.

Figure 11:
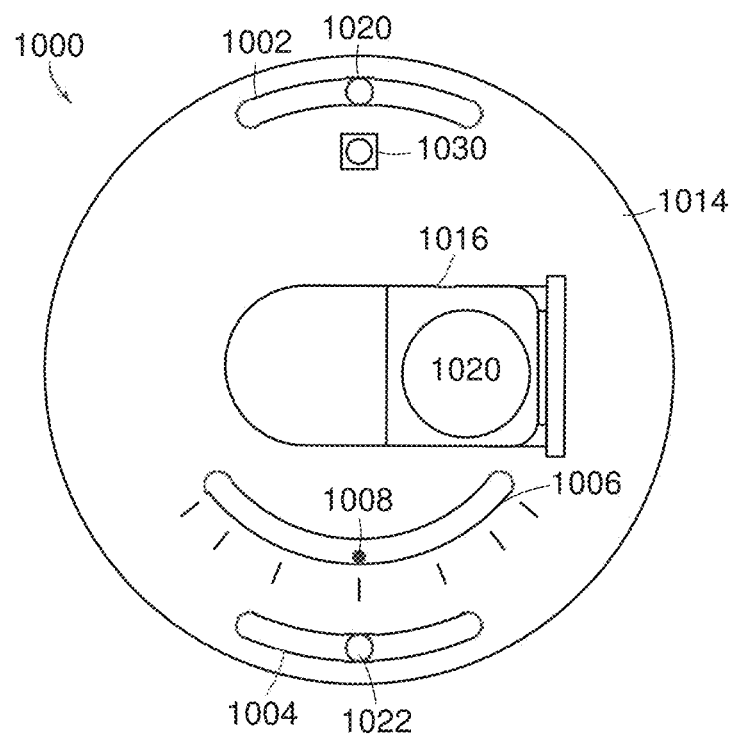
FIG. 11 is a front view of another embodiment wherein a baseplate is adjustable across a continuous range of angles.

FIG. 11 illustrates an embodiment where a device 1000 includes a second conduit portion 1016 which is rotationally fixed to a baseplate 1014. In this manner, the inclination of the second conduit portion 1016 is not adjustable relative to the baseplate. The inclination of the second conduit portion can be changed by loosening mounting fasteners 1020, 1022, rotating mounting slots 1002, 1004 about the fasteners, and tightening mounting fasteners 1022, 1024.

A curved vial 1006 with a weighted ball 1008 or other suitable pointer may be used indicate the roll angle and/or the threshold pressure differential set point brought about by the roll angle of the baseplate. The vial may include a liquid and a gas bubble. A pitch level 1030 may be included to help installation of the device such that the baseplate 1014 is vertically aligned. Together, the pitch indicator 1030 and the roll indicator 1006 are used to calibrate the correct orientation of the device so that the inclination angle of the second conduit 1016 may be calibrated.

Figure 12:
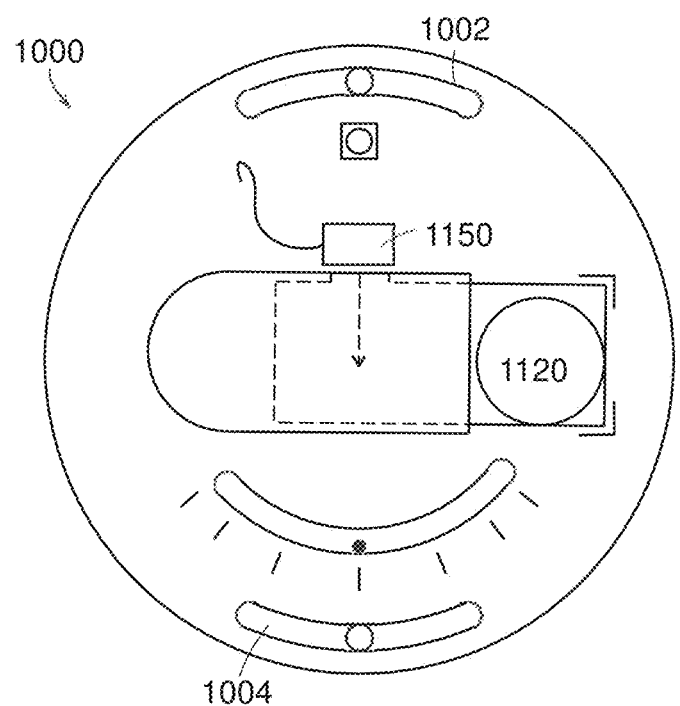
FIG. 12 shows the embodiment of FIG. 10 with a photoelectric detector attached to the device.

FIG. 12 shows an embodiment similar to the embodiment of FIG. 11, and additionally includes a photoelectric sensor 1150 or other sensor to sense the presence and/or absence of a ball 1120.

Figure 13:
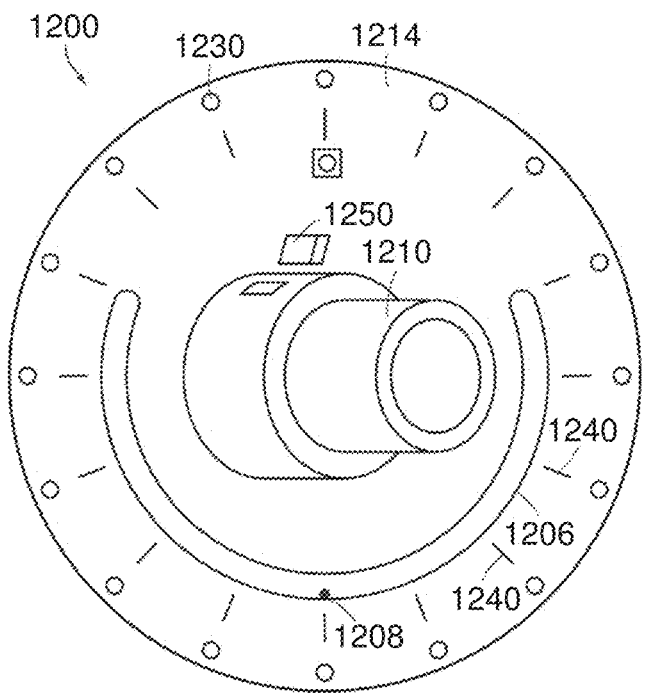
FIG. 13 is a front view of an alternative embodiment.

FIG. 13 shows an embodiment of a device 1200 which is similar to the embodiments illustrated in FIGS. 11 and 12 in several respects, but has a second conduit portion 1210 which is not parallel to the barrier. In this embodiment, the second conduit portion 1210 has a yaw rotation relative to baseplate 1214. As such, a ball in the transparent portion of the second conduit portion 1210 may be viewable from the side of the device and the front of the device. As discussed above regarding various embodiments, a plurality of mounting holes 1230 may be provided to permit mounting of the device in a plurality of roll orientations. In some embodiments, the device may provide fewer discrete mounting orientations, for example, only one orientation or only two mounting orientations. A weighted ball 1208 may held within a curved vial 1206 to associate a mounted orientation with markings 1240 to indicate the threshold differential pressure set point. A photoelectric sensor 1250 or other sensor may be included to sense the presence and/or absence of a ball.

Figure 14:
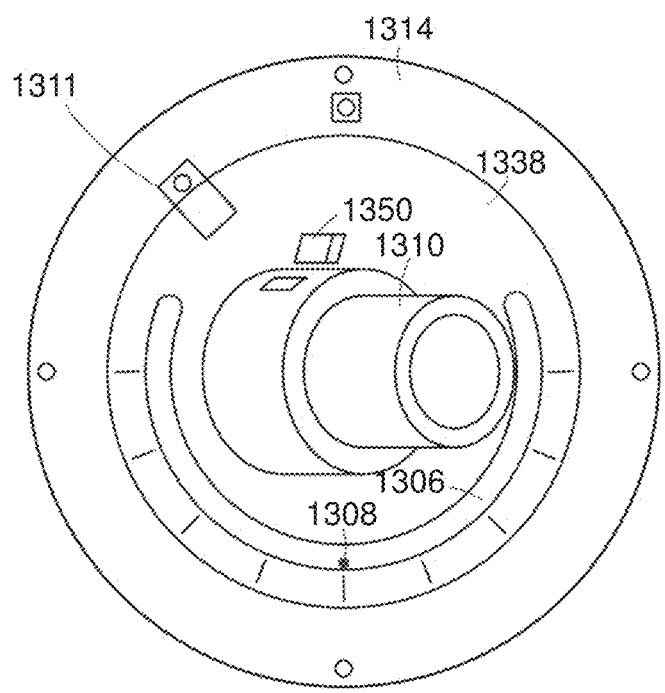
FIG. 14 is a front view of an alternative embodiment with a rotatable base.

FIG. 14 shows an embodiment of a device 1300, which, similar to the embodiment of FIG. 13, includes a second conduit portion 1310 that is rotated away from the baseplate so that a side of the transparent portion of the second conduit portion 1310 is visible both from the side of the device and from the front of the device.

In the embodiment of FIG. 14, the second conduit 1310 is mounted to a rotatable base 1338 which is rotatable relative to a baseplate 1314. In this manner, the second conduit portion 1310 can be rotated continuously along a range of roll angles. A weighted ball 1308 may held within a curved vial 1306 to associate a mounted orientation with markings 1340 to indicate the threshold differential pressure set point. A photoelectric sensor 1350 or other sensor may be included to sense the presence and/or absence of a ball. A lock, such as a rotating tab 1311, may be used to hold the rotating base against rotating.

Figure 15:
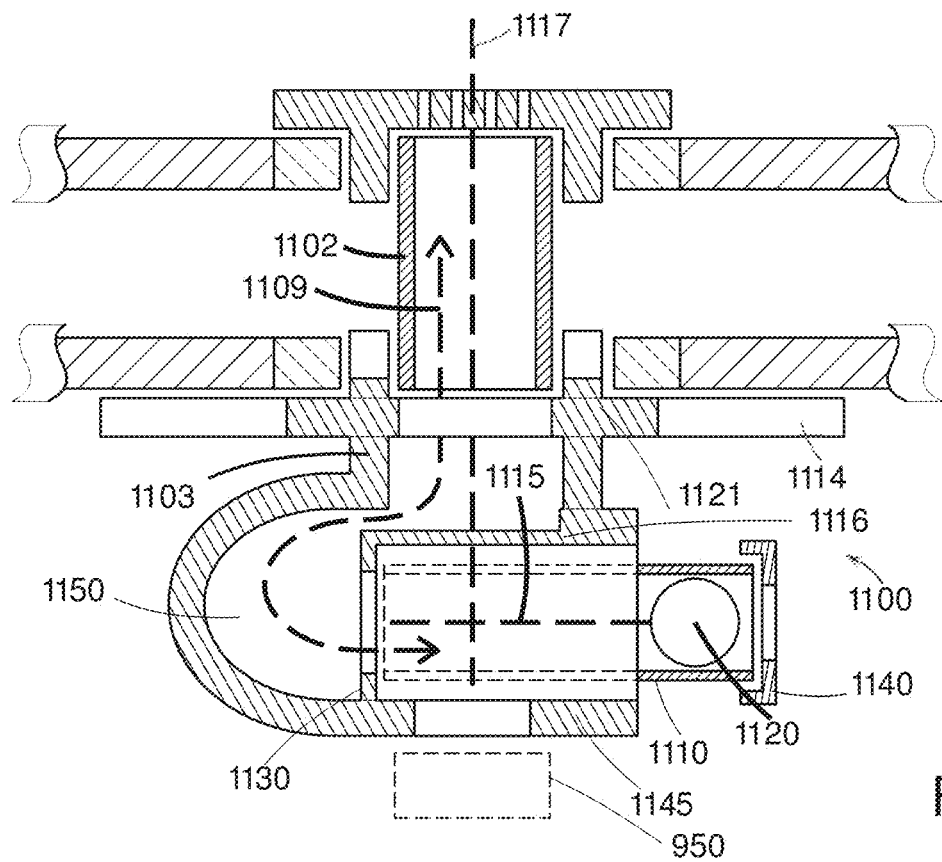
FIG. 15 is a top cross-sectional view of an alternative embodiment of a device for indicating a directional differential pressure.

FIG. 15 shows an embodiment of a threshold directional differential pressure indicator configured to provide a reduced radial extent of a second conduit portion 1110 from a rotation axis of the second conduit portion as compared to some arrangements where a second conduit portion is attached to a baseplate with a single ninety degree bend. In the orientation illustrated in FIG. 15, an airflow path 1109 between a first conduit portion 1102 and the second conduit portion 1110 travels in a first lateral direction upon exiting the first conduit toward the second conduit, and then turns and travels in a second lateral direction within the second conduit portion. This arrangement allows the second conduit portion to be positioned farther to the left (from the viewpoint of FIG. 15) as compared to an arrangement where the airflow path exits the first conduit portion and makes a single turn into the second conduit portion. In some embodiments, portion 1103 may be considered to be part of a first conduit portion, or in some embodiments may be an entirety of a first conduit portion.

The embodiment illustrated in FIG. 15 allows the device threshold differential pressure set points to be adjustable after the baseplate is secured to the barrier.

In some embodiments, a movable element such as a ball 1120 travels along a travel path, such as a travel path 1115, which is located in a travel path section 1116 of the second conduit. When the ball travels toward the opening of conduit 1110 closest to the fluid path of the first space (e.g., a proximal end of the travel path section), a ball stop, such as an end stop 1130 stops the ball from leaving second conduit 1110. End stop 1130 has an opening for fluidic communication between the first space and the second space. When the ball travels toward the opening of second conduit portion 1110 closest to the fluid path of the second space (e.g., toward a distal end of the travel path section), a ball stop, such as an end stop 1140 stops the ball from leaving second conduit 1110. End stop 1140 has an opening for fluidic communication between the first space and the second space. When the ball is located next to end stop 1140, the transparent conduit 1110 allows a viewer to see the ball. When the ball travels at least one ball diameter towards end stop 1130, conduit wall 1145 of the second conduit portion may be opaque and the ball is no longer visible from the side of conduit 1110.

In some embodiments, the travel path length may be one and a half ball diameters, two or more ball diameters, or any suitable length. Proximal end stop 1130 may be located on an opposite side of a rotation axis 1117 as distal end stop 1140. A plenum portion 1150 may be provided in second conduit portion 1110 and provide at least part of a fluidic connection between the first conduit portion 1102 and the second conduit portion 1110.

When the travel path starts at a lateral position which is at or near the lateral position of a rotation axis 1117 of the second conduit portion 1110, the second conduit extends radially by approximately the length of the second conduit portion (when the second conduit portion is parallel to the wall). By shifting the second conduit portion, the travel path 1115 of the ball 1120 crosses the location of rotation axis 1117, and reduces the lateral extent of the second conduit portion from the rotation axis, which may be the approximate center of the device in the front view. In this manner, a suitable travel length for the movable element may be provided while reducing the radial extent of the device.

The pathway between the first and second spaces may be configured such that the fluid (e.g., air) path adjacent to an entrance to a proximal end of the travel path section is substantially aligned with the direction of travel path 1115.

Figure 16:
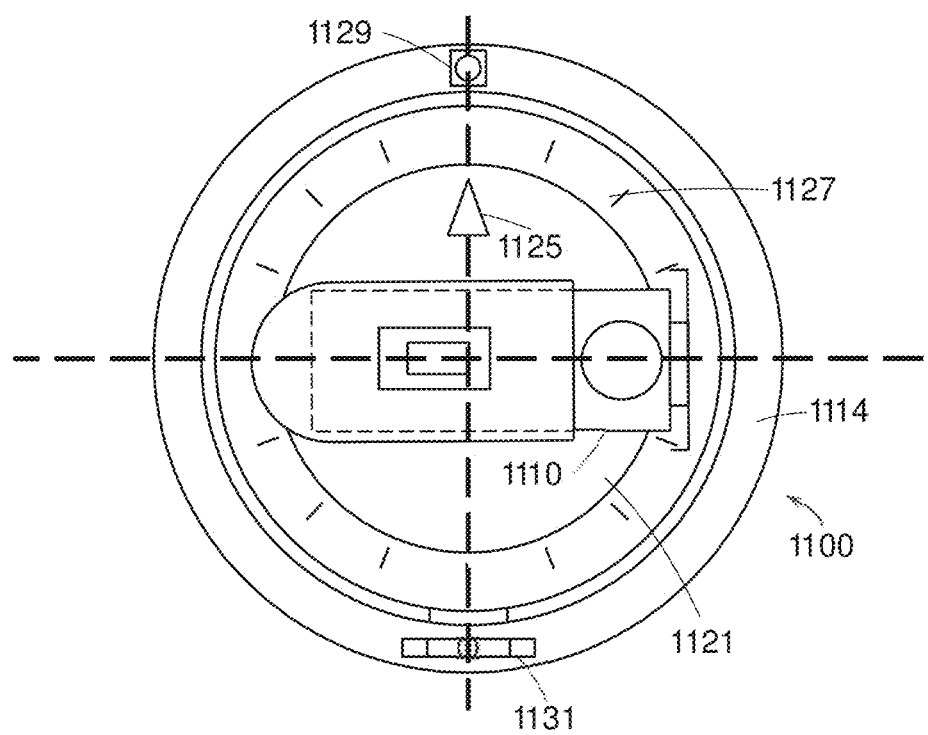
FIG. 16 is a front view of an embodiment similar to the embodiment shown in FIG. 15.

FIG. 16 shows a front view of an embodiment similar to the embodiment of FIG. 15. In the embodiment of FIG. 16, the second conduit portion 1110 is attached to a rotatable base 1121 which rotates relative to a baseplate 1114, the baseplate being fixed to the wall. A pointer 1125 on rotatable base 1121 may be arranged to point to markings 1127 on the baseplate 1114. Pluralities of markings 1127 may be disposed on a baseplate 1114 which is fixed to the wall. The markings may be disposed around a circumference of the rotatable base 1121 at predetermined intervals and may denote various inclination angles of the second conduit 1110. The markings may correspond to threshold differential pressure set point values shown on a separate chart, or the markings may directly display threshold differential pressure set point values. During installation of the device, the rotatable base 1121 may be rotated to an orientation such that a desired differential pressure threshold may be set for a given space. The accuracy of the markings 1127 may be affected by the alignment of the rotating base 1121 axis of rotation with a horizontal plane. Whether the axis of rotation is aligned as desired may be indicated with a first level 1129. Additionally, the accuracy may also be partly determined by the roll orientation of the baseplate 1127. Whether the roll orientation is at a desired angle may be indicated by a second level 1131. Together, the pitch indicator 1129 and the roll indicator 1131 may be used to calibrate the orientation of the device so the markings and pointer provide accurate readings. A photoelectric detector 950 and/or other detector may be employed to detect the presence and/or absence of a ball. Shims may be used along with the pitch level 1129 to set the baseplate 1114 plumb, and thus set a horizontal axis of rotation for rotatable base 1121.

A pitch level 1129 and/or a roll level 1131 may be included on the device to facilitate an accurate installation of the device, and to confirm continued alignment of the device over time.

Figure 17:
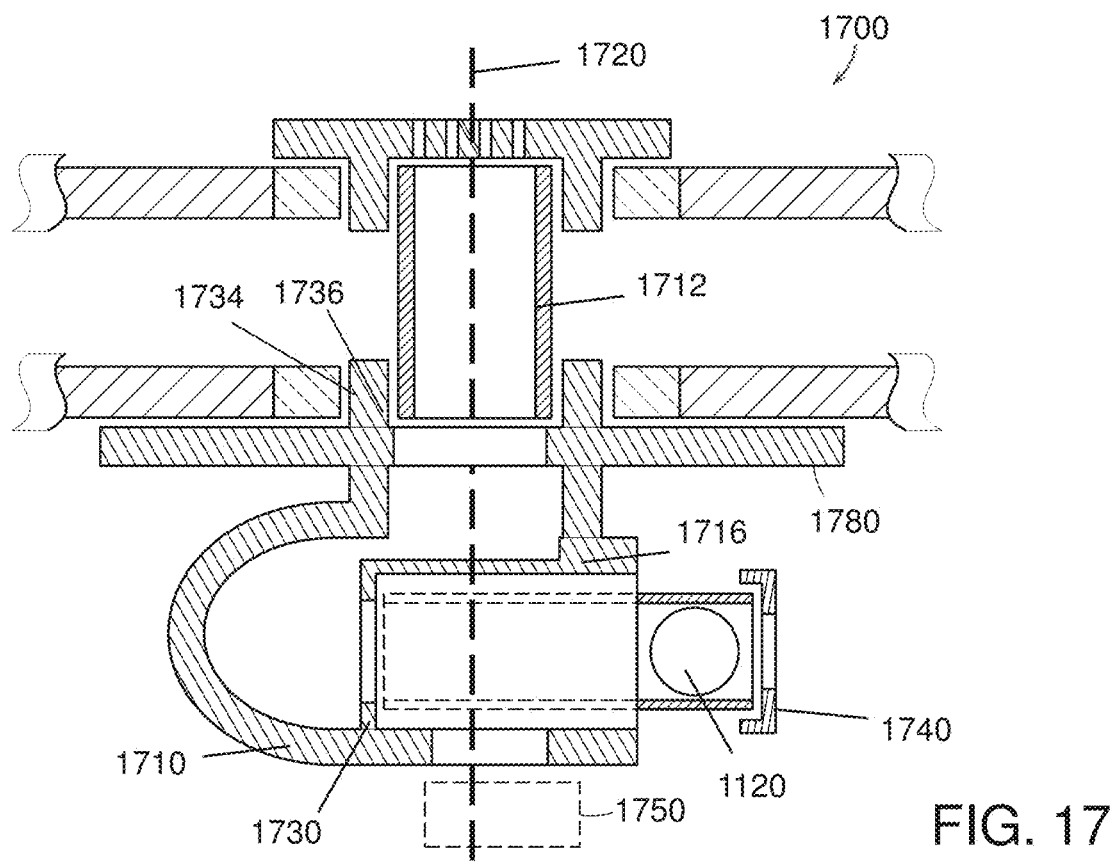
FIG. 17 is a top cross-sectional view of an alternative embodiment.
Figure 18:
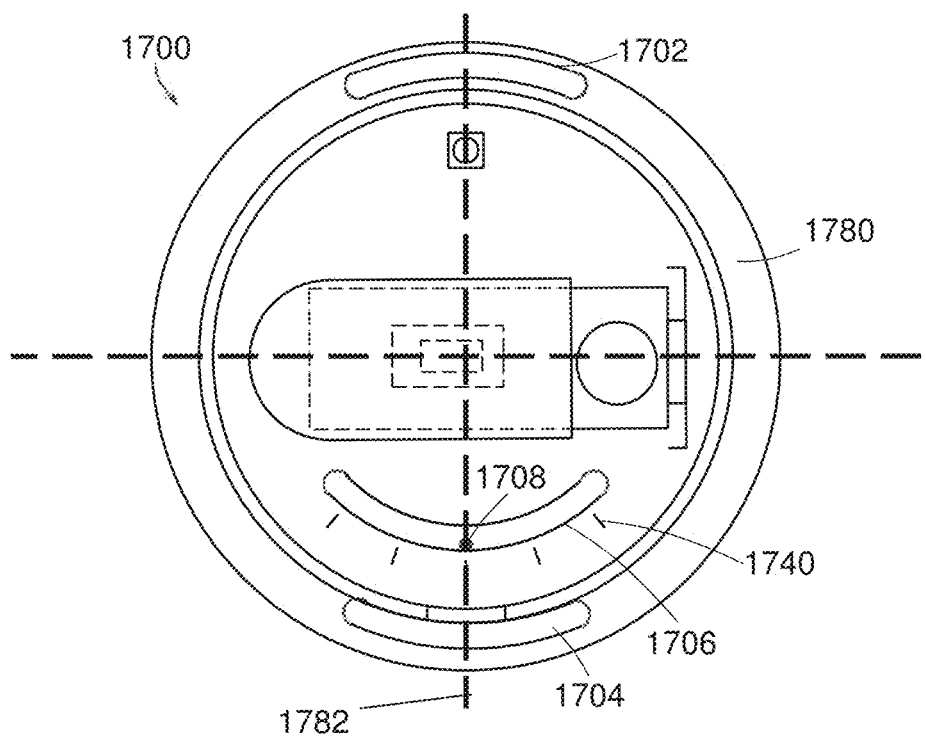
FIG. 18 is a front view of the embodiment shown in FIG. 17.

FIGS. 17 and 18 show an embodiment of a threshold directional differential pressure indicator configured to provide a reduced radial extent of a second conduit portion 1110. The illustrated embodiment allows the device threshold differential pressure set points to be adjustable when the baseplate is loosely mounted and then becomes non-adjustable after the baseplate is secured to the barrier. The embodiment of FIGS. 17 and 18 are similar to the embodiment illustrated in FIGS. 15 and 16, but instead of including a rotatable base, the embodiment of FIGS. 17 and 18 includes mounting slots 1702, 1704 in the baseplate. In this manner the roll orientation of the baseplate may be continuously varied across a given range prior to securing the baseplate to the barrier.

A weighted ball 1708 may held within a curved vial 1706 to associate a mounted orientation with markings 1740 to indicate the set point. A photoelectric sensor 1750 or other sensor may be included to sense the presence and/or absence of a ball.

An imaginary axis 1720 may be oriented to be perpendicular to the baseplate, and oriented to extend through a center of the first conduit portion 1712. A travel path section 1716 of the second conduit portion 1710 may be positioned such that imaginary axis 1720 intersects travel path section 1716 between a proximal ball stop and a distal ball stop, such as proximal end stop 1730 and distal end stop 1740. And as shown in FIG. 17, the imaginary axis does not intersect either of the proximal ball stop and the distal ball in some embodiments. In some embodiments, travel path section 1716 of the second conduit portion 1710 may be positioned such that when ball 1120 is contacting a proximal ball stop such as end stop 1730, at least a portion of the ball may travel past imaginary axis 1720. In some embodiments, the entire ball may be positioned on a first side of the imaginary axis when in contact with proximal end stop 1730, and the entire ball may be positioned on second, opposite side of the imaginary axis when in contact with distal end stop 1740. In some embodiments, the imaginary axis intersects the travel path section 1720 at a middle of travel path section 1720. In some embodiments, the travel path section is oriented parallel to the baseplate, though in some embodiments (see FIG. 23 for example), the travel path section may be oriented transverse to the baseplate. In some embodiments, the imaginary axis intersects the second conduit portion in the middle of a side-to-side extent of the second conduit axis. For example, the second conduit portion may have a radial extent to one side of the imaginary axis which is the same as the radial extent on an opposite side of the imaginary axis.

The location where the imaginary axis is defined in part by the first conduit may be where the first conduit portion reaches the barrier. For example, in FIG. 17, the first conduit portion may include a collar 1734 attached to the baseplate. An internal perimeter of the collar at a location 1736 where the collar reaches the exterior opening in the barrier may be the location where the center of the first conduit portion is used to help define the imaginary axis. In some embodiments, the device may not protrude into the barrier, and an opening in the baseplate which abuts the barrier may be considered to be a first conduit portion, and the internal perimeter at the location where the baseplate opening abuts the barrier may be considered to be the portion which is used in part to define the imaginary axis. The center of the first conduit portion is the center of a circle in many embodiments. If the inside perimeter of the first conduit is not a circle, for purposes herein, the center of the conduit is considered to be the centroid.

In some embodiments where the second conduit portion is pivotable about a pivot axis, the imaginary axis may be aligned with the pivot axis. In some embodiments, the imaginary axis may be parallel to the pivot axis. The imaginary axis may be constructed in other embodiments disclosed herein, including at least FIGS. 18-23.

In some embodiments, an imaginary vertical plane may be defined in a plane which includes the imaginary vertical axis. For example, an imaginary vertical plane 1782 is shown in FIG. 18, and imaginary vertical plane 1782 may include the imaginary vertical axis as described above. The imaginary vertical plane may be perpendicular to the baseplate in some embodiments.

Figure 3:
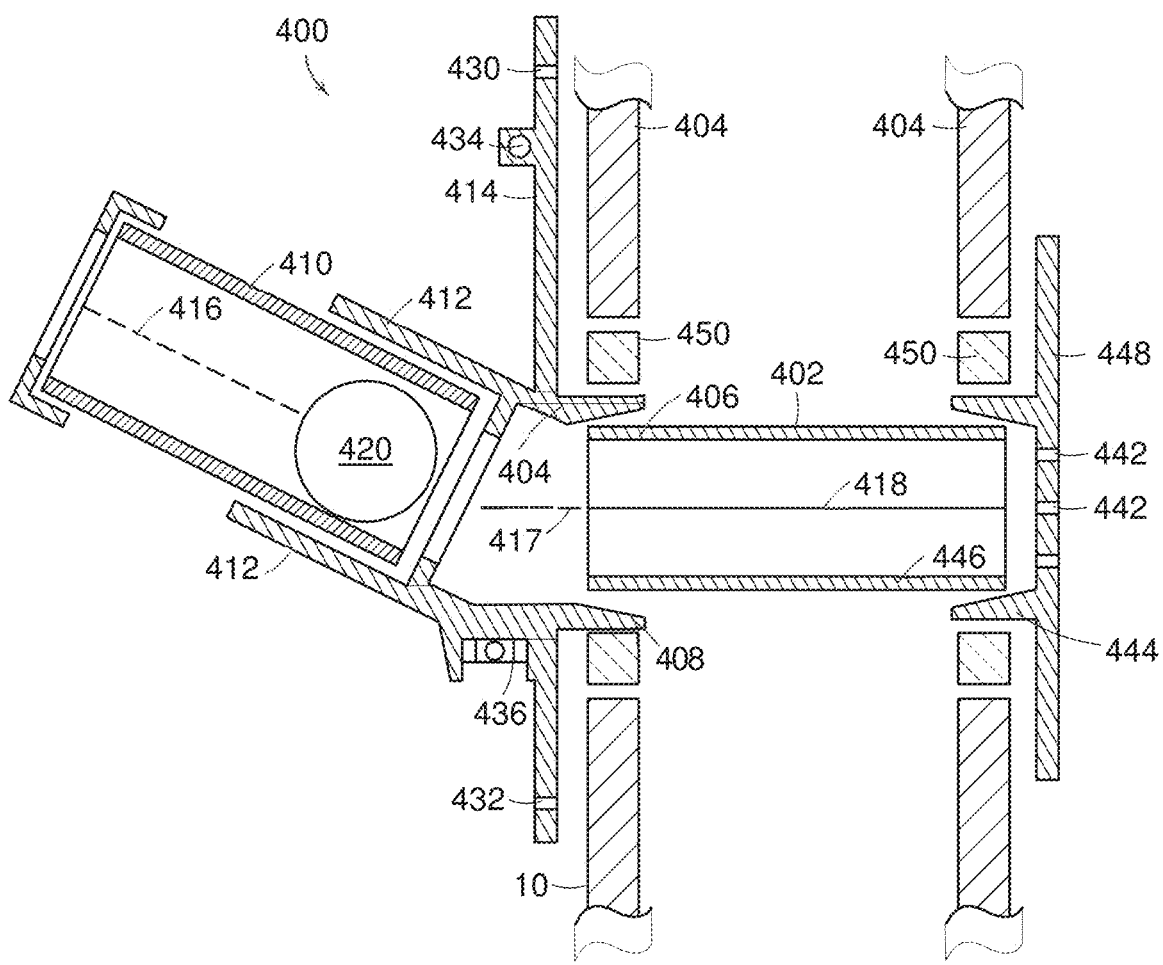
FIG. 3 is a cross-sectional side view of the embodiment of FIG. 1 in the installed orientation shown in FIG. 1.
Figure 4:
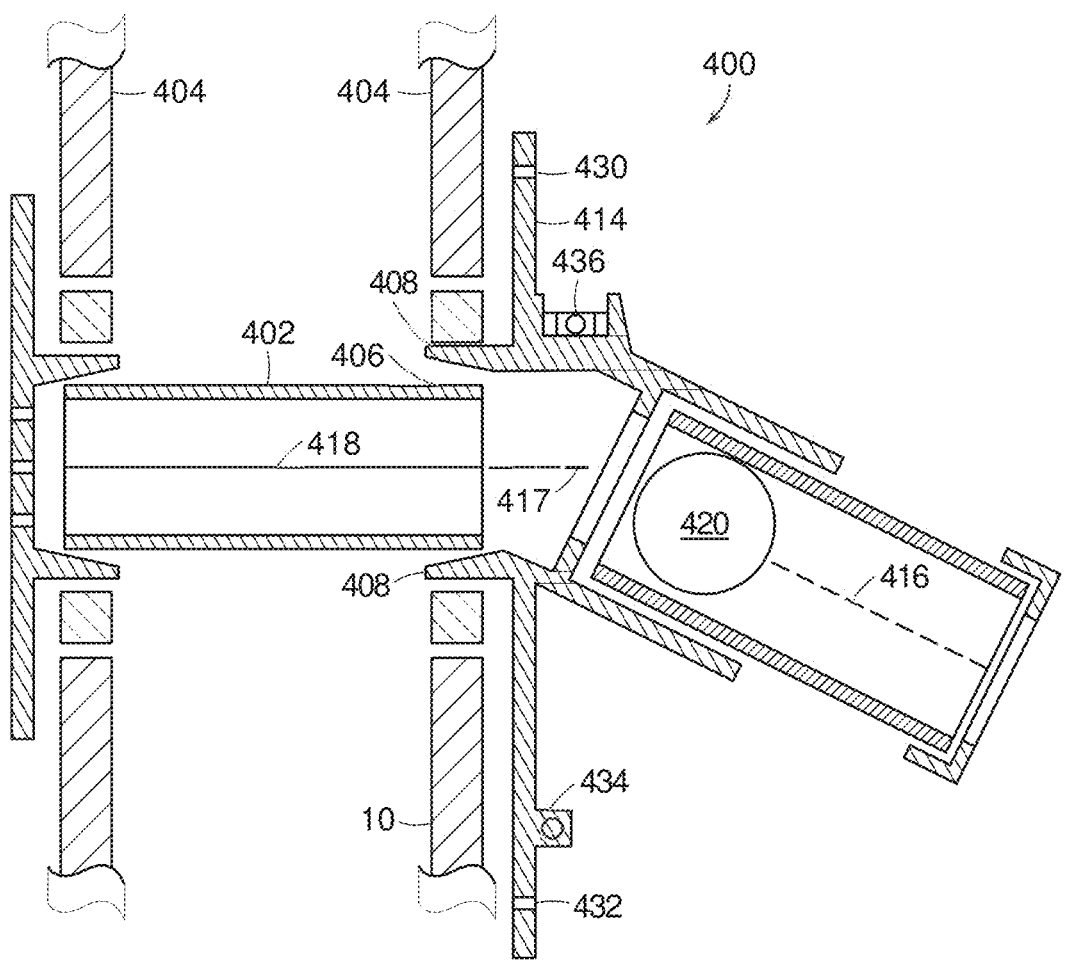
FIG. 4 is a cross-sectional side view of the embodiment of FIG. 1 in the installed orientation shown in FIG. 2.
Figure 19:
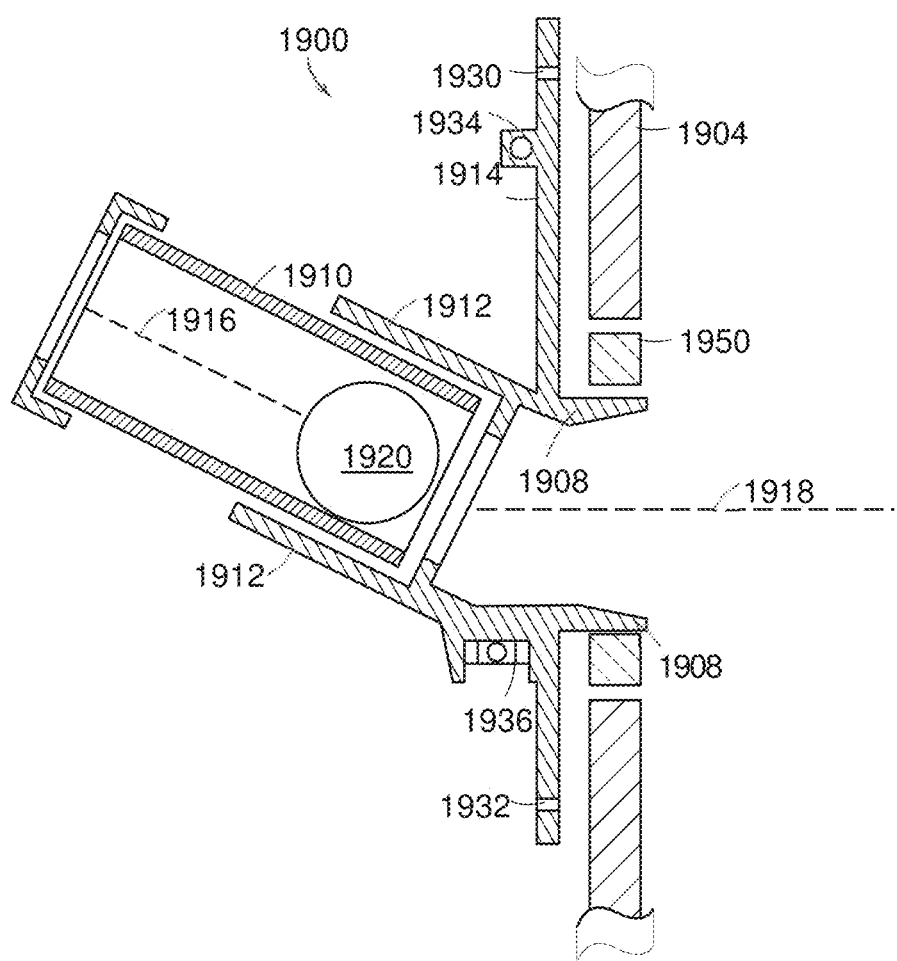
FIG. 19 is a cross-sectional side view of an alternative embodiment of a device for indication a directional differential pressure.

FIG. 19 shows one embodiment of a device 1900 that is similar to the embodiment shown in FIGS. 1 and 3, but in FIG. 1 the device is mounted to a barrier having a single skin. FIG. 19 shows the barrier partially penetrated by the first conduit portion 1908. In some embodiments, no portion of the device penetrates the barrier and the first conduit portion 1908 is aligned with the opening in the barrier. Device 1900 includes a first conduit portion 1908 which is configured to pass through at least a portion of a barrier 1904. Notably, the barrier 1904 may be a single solid piece of material, such as a glass pane. That is, the first conduit portion 1908 may provide fluid communication between two spaces separated by the barrier 1904, where the barrier does not include any air gap or internal space. As shown in FIG. 19, a second conduit portion 1910 is attached to a second conduit support 1912, which in this embodiment is a cylinder with an internal diameter that accepts the external diameter of the second conduit portion. The first conduit and second conduit support, 1908, 1912 are shown as being integrally formed with a baseplate 1914, though in other embodiments, one or both of the conduit supports may be separately formed and then attached to the base baseplate 1914.

According to the embodiment of FIG. 19, the second conduit portion 1910 has a longitudinal axis 1916 which is angled relative to a longitudinal axis 1918 of the first conduit 1908. With the first conduit portion longitudinal axis 1918 being horizontal in the illustrated embodiment, the longitudinal axis 1916 of the second portion is inclined relative to a horizontal plane. Accordingly, in the orientation shown in FIG. 19, to move a ball 1920 (or other movable element) upwardly within the second conduit portion, the space on the right hand side of the barrier 1904 will need to have a pressure that is higher than the pressure on the left hand side of the barrier. Additionally, to move the ball, the pressure difference between the two spaces will have to provide enough force on the ball to overcome the gravitational force on the ball. In this manner, the weight of the ball and the incline of the second conduit portion establish a threshold pressure differential.

According to the embodiment of FIG. 19 and similar to the embodiment of FIGS. 1-4, the device 1900 includes two mounting holes 1930, 1932 on the baseplate 1914 to aid in mounting the device to a wall or other barrier. In the illustrated embodiment, the mounting holes are positioned 180° apart from each other and positioned relative to the second conduit such that the second conduit is pitched at the maximum angle relative a horizontal plane when the mounting holes are aligned vertically. Such an arrangement can ease installation by not requiring measurements or calibrations to be performed beyond confirming a suitable roll orientation and confirming that the device is plumb.

The illustrated embodiment may be installed in either of two orientations when the mounting holes are vertically aligned. In this manner, the device may be used to indicate positive pressure when mounted in a first orientation, or to indicate negative pressure when mounted in a second orientation. Other orientations are possible if the mounting holes are rotated to be not vertically aligned. However, installation procedures can be set forth in a straightforward manner to achieve a desired set point by manufacturing a device with second conduit portion which does not change in angle relative to the first conduit portion, and instructing the installer to align the mounting holes vertically.

In some embodiments, to maintain a constant angle between longitudinal axis 1916 of second conduit portion 1910 and longitudinal axis 1918 of first conduit portion 1908, the first conduit portion and second conduit portion are connected such that the supports are fixed relative to each other from an orientation standpoint. Conduit support 1912 cannot be rotated relative to the first conduit portion 1908 in the illustrated embodiment. In this manner, once conduit support 1912 is fixed to the wall via baseplate 1914, the angle of inclination is set and not adjustable without removing the baseplate.

In the illustrated embodiment, longitudinal axis 1918 is horizontal, though in some embodiments, longitudinal axis 1918 may be non-horizontal. Having longitudinal axis 1918 be horizontal helps permit baseplate to be oriented in either of two orientations that are 180° opposite to each other in a manner which allows second conduit portion 1910 to have either of two opposite angles (e.g., +5° or −5°, or +15° and −15°).

According to some embodiments as shown in FIG. 19, the device includes a first level 1934 and a second level 1936 which are disposed on the baseplate 1914 and are used to assist in mounting the rotatable base to a first side of the barrier to confirm that the second conduit portion is inclined at the correct angle. The second level 1936 is arranged in a direction transverse to the first side of the barrier and is configured to indicate whether the baseplate 1914 is aligned with a vertical plane. When the baseplate is secured to the barrier, the second level also may indicate whether the barrier is out of plumb and not vertical. If the baseplate is not aligned with a vertical plane in the illustrated embodiment, the angle of inclination of the second conduit portion will not have the correct angle of inclination which establishes the threshold pressure differential set point. An installer may set the correct threshold pressure set point by ensuring the second level 1936 indicates alignment of a rear of the baseplate with a vertical plane. For example, if the wall is not plumb, the baseplate 1914 may be shimmed or otherwise adjusted until the second level 1936 shows that the device is correctly aligned. In one embodiment, the second level 1936 may use an air bubble in liquid to indicate whether the device is oriented correctly, though other arrangements may be used.

According to the embodiment of FIG. 19, the first level 1934 is configured to allow an installer to see whether a roll orientation of the baseplate 1914 on the barrier is correct, and therefore the first level is oriented perpendicularly to the second level 1936. That is, the first level indicates when the baseplate is in a correct roll orientation relative to the barrier so that the roll orientation of the second conduit portion is correct.

According to the embodiment of FIG. 19, the device 1900 may include a fire stop system that, upon the detection of a threshold level of smoke or fire, provides a barrier that blocks or otherwise mitigates travel of the smoke/fire from one space or room to another. The fire stop system may include various components used to seal the passage within the wall. For example, as shown in FIG. 19, the fire stop system may include a single fire stop ring 1950 located on the barrier 1904. The fire stop ring may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer. Devices of exemplary embodiments herein may be employed in fire-rated or non-fire-rated applications, as the present disclosure is not so limited.

According to the embodiment of FIG. 19, the second conduit support 1912 may be constructed with an opaque material so that the ball is not visible from the side of the device. In this manner, the presence or absence of the ball can be readily noticed to understand whether the threshold pressure differential is being met. By hiding or at least partially hiding the ball in the second conduit portion support (e.g. a collar), it is not necessary for the ball to pass through the barrier 1904 for the ball to be hidden. Accordingly, the first conduit portion 1908 may have a smaller diameter than the ball, which may reduce the size of the penetration that is made through the wall to install the device. For example, the ball may have a diameter of 1.5 inches, and the second conduit portion may have an inside diameter slightly larger than the ball. The first conduit portion 1908 may have an inner diameter of one inch, or half an inch, or any other suitable inner diameter that is smaller than the diameter of the ball.

In some embodiments, a device may not extend into a barrier or wall to which it is attached. For example, in some embodiments the device may be positioned only on a single side of the barrier. According to some embodiments, a device may only include a single inclined conduit, where the inclined conduit does not penetrate the barrier. That is, the device may be attached to a single side of the wall (e.g., with fasteners such as mechanical fasteners or adhesives) without any portion of the device protruding through the barrier. Of course, in other embodiments a device may fully or partially penetrate a barrier, as the present disclosure is not so limited.

Figure 20:
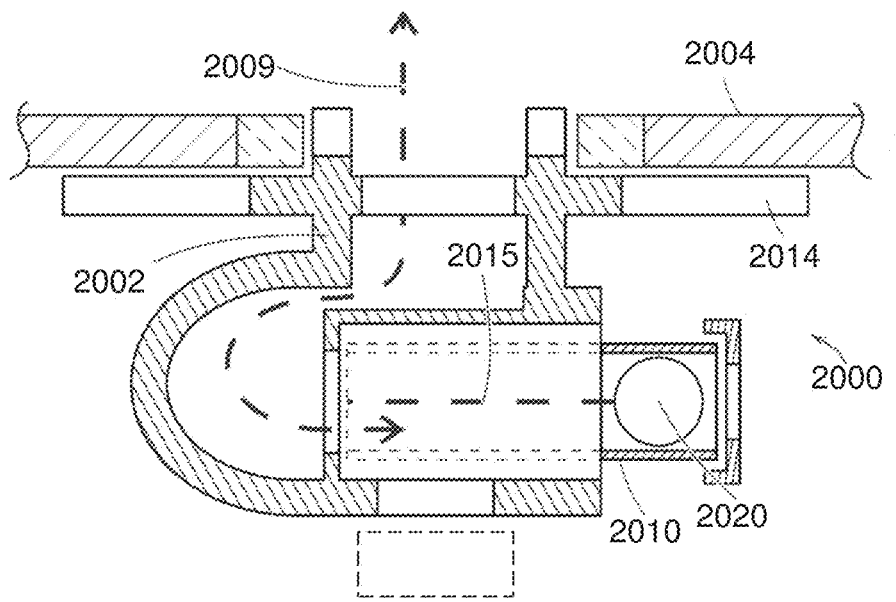
FIG. 20 is a top cross-sectional view of an alternative embodiment of a device for indicating a directional differential pressure.

FIG. 20 shows an embodiment of a threshold directional differential pressure indicator device 2000 configured to provide a reduced radial extent of a second conduit portion 2010 from a rotation axis of the second conduit portion, similar to the embodiment of FIG. 15. In the orientation illustrated in FIG. 20, an airflow path 2009 between a first conduit portion 2002 and the second conduit portion 2010 travels in a first lateral direction upon exiting the first conduit, and then turns and travels in a second lateral direction within the second conduit portion. This arrangement allows the second conduit portion to be positioned farther to the left (from the viewpoint of FIG. 20) as compared to an arrangement where the airflow path exits the first conduit portion and makes a single turn into the second conduit portion. According to the embodiment of FIG. 20, the device 2000 is mounted on a single side of a barrier 2004. The barrier 2004 may be formed as solid object, having no interior volume or space. For example, the barrier 2004 may be configured as a glass pane. A baseplate 2014 of the device may be secured to the barrier 2004 with a suitable fastener such as a mechanical fastener or adhesive. While in the embodiment of FIG. 20 the device may protrude into the barrier 2004 slightly, in other embodiments the device may be mounted solely on one side of barrier, where no portion of the device protrudes into the barrier. Of course, in other embodiments the device may protrude partially through a barrier, as the present disclosure is not so limited.

According to the embodiment of FIG. 20, a movable element such as a ball 2020 has a travel path, such as a travel path 2015. When the travel path starts at a lateral position which is at or near the lateral position of a rotation axis of the second conduit portion 2010, the second conduit extends radially by approximately the length of the second conduit portion (when the second conduit portion is parallel to the wall). By shifting the second conduit portion, the travel path 2015 of the ball 2020 crosses the location of the rotation axis, and reduces the lateral extent of the second conduit portion from the rotation axis, which may be the approximate center of the device in the front view. Put alternatively, the second conduit portion 2010 has a longitudinal travel path for a movable element that extends transversely to a longitudinal axis of the first conduit portion. The travel path extends beyond the longitudinal axis of the first conduit portion in two opposite directions. In this manner, the travel path in the second conduit portion may be intersected (in some cases bisected) by the longitudinal axis of the first conduit portion. In some embodiments, the travel path of the second conduit portion may be perpendicular to the longitudinal axis of the first conduit portion. The travel path for the movable element need not be linear to have a longitudinal direction. If the travel path is curved, then the longitudinal direction of the travel path also has a curve. For purposes herein, an axis or direction which is said to be transverse to a different axis or direction need not necessarily intersect with the different axis or direction. The axes or directions may be in different planes and not parallel, and be considered to be transverse. Embodiments herein with axes and/or directions which are indicated to be transverse may also intersect in some embodiments.

Figure 21:
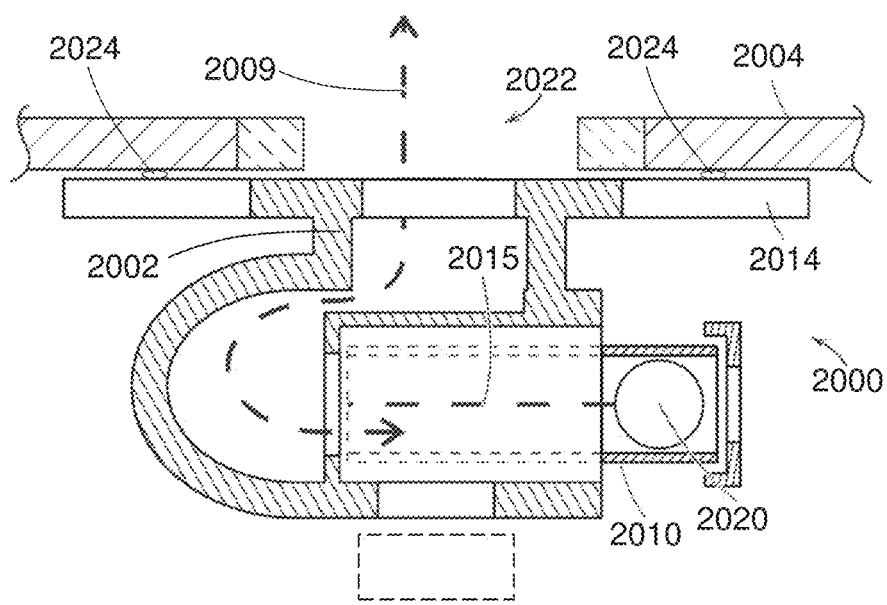
FIG. 21 is a top cross-sectional view of an alternative embodiment of a device for indicating a directional differential pressure.

FIG. 21 shows an embodiment of a threshold directional differential pressure indicator device 2000 configured to provide a reduced radial extent of a second conduit portion 2010 from a rotation axis of the second conduit portion, similar to the embodiment of FIG. 20. Like FIG. 20, and in the orientation illustrated in FIG. 21, an airflow path 2009 between a first conduit portion 2002 and the second conduit portion 2010 travels in a first lateral direction upon exiting the first conduit, and then turns and travels in a second lateral direction, substantially opposite to the first lateral direction within the second conduit portion. According to the embodiment of FIG. 21, the device 2000 is mounted on a single side of a barrier 2004, where no portion of the device protrudes into an opening 2022 formed in the barrier 2004. The barrier 2004 may be formed as solid object, having no interior volume or space. For example, the barrier 2004 may be configured as a glass pane. A baseplate 2014 of the device may be secured to the barrier 2004 with a suitable fastener such as a mechanical fastener or adhesive. As shown in FIG. 21, the device also includes a seal 2024 positioned between the baseplate 2014 and the barrier 2004. The seal may be configured as an O-ring or another suitable seal that prevents air from passing between the baseplate 2014 and the barrier 2004. In some embodiments, the fastener attached the baseplate to the barrier (such as adhesive) may form the seal between the baseplate and the barrier.

Figure 22:
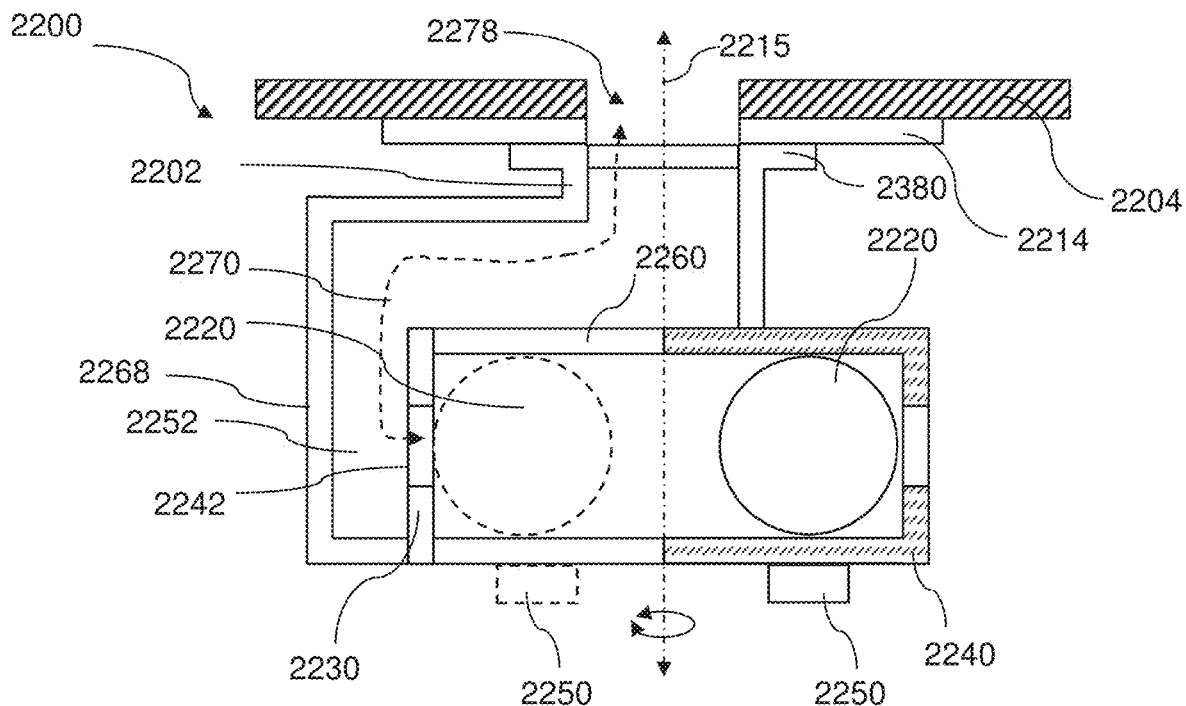
FIG. 22 is a top cross-sectional view of an alternative embodiment of a device for indicating a directional differential pressure.

FIG. 22 shows an embodiment of a threshold directional differential pressure indicator device 2200 where movable element 2220 is positionable entirely to a first side of pivot axis 2215 when the movable element is contacting a movable element stop 2230—the movable element is shown in dashed lines in this position. In some embodiments, a portion of the movable element extends to a first side of pivot axis 2215. When the movable element 2220 is contacting a distal movable element stop 2240, the movable element is shown as entirely on a second side, opposite from the first side, of the pivot axis 2215. In some embodiments the line representing pivot axis 2215 may instead or additionally represent an imaginary axis or an imaginary plane (such as a vertical plane) as explained above with reference to FIGS. 17-18. When discussing proximal and distal movable element stops, the terms proximal and distal are used in a relative sense. A proximal movable element does not necessarily mean that the proximal movable element is at an end of a conduit portion, and likewise, a distal movable element does not necessarily mean that the distal movable element is at an end of a conduit portion. Generally, the term proximal is used herein for a component which is configured to be closer to the barrier opening along a fluid connection path or air flow path when the device is mounted, as compared to a more distal component which is configured to be farther from the barrier opening along a fluid connection path or air flow path when the device is mounted.

A photoelectric sensor 2250 may be positioned at one or both regions of a travel path section 2260 to either side of the pivot axis.

A plenum 2252 may be present adjacent to a proximal end of the travel path section 2260. The plenum may serve to help align air flow so that as air flow can enter an opening 2242 located on an end face of travel path section 2260. By entering through an end face, the air flow is more aligned with a longitudinal direction of the travel path section that if the air flow were to enter from a sidewall of the travel path section.

The second conduit portion may be attached to a rotating base 2380 which is rotatable relative to baseplate 2214.

A flow path 2270 shows how fluid may travel from an opening in baseplate 2278, through first conduit portion 2202, and to opening 2242 through several bends. The path is shown as turning ninety degrees three times. Fluid may flow in either direction in some embodiments. In some embodiments, and as shown in FIG. 22, the path may reverse on itself by one hundred eighty degrees. In some embodiments, the path may change direction in the plenum 2252 by at least one hundred thirty-five degrees.

The cross-hatched portion of the movable element travel path section 2260 may be transparent in some embodiments, while the non-cross-hatched portion may be opaque in some embodiments, such that the movable element 2220 is visible when located at the distal ball stop 2240, and not as readily visible when located at proximal ball stop 2230.

Figure 23:
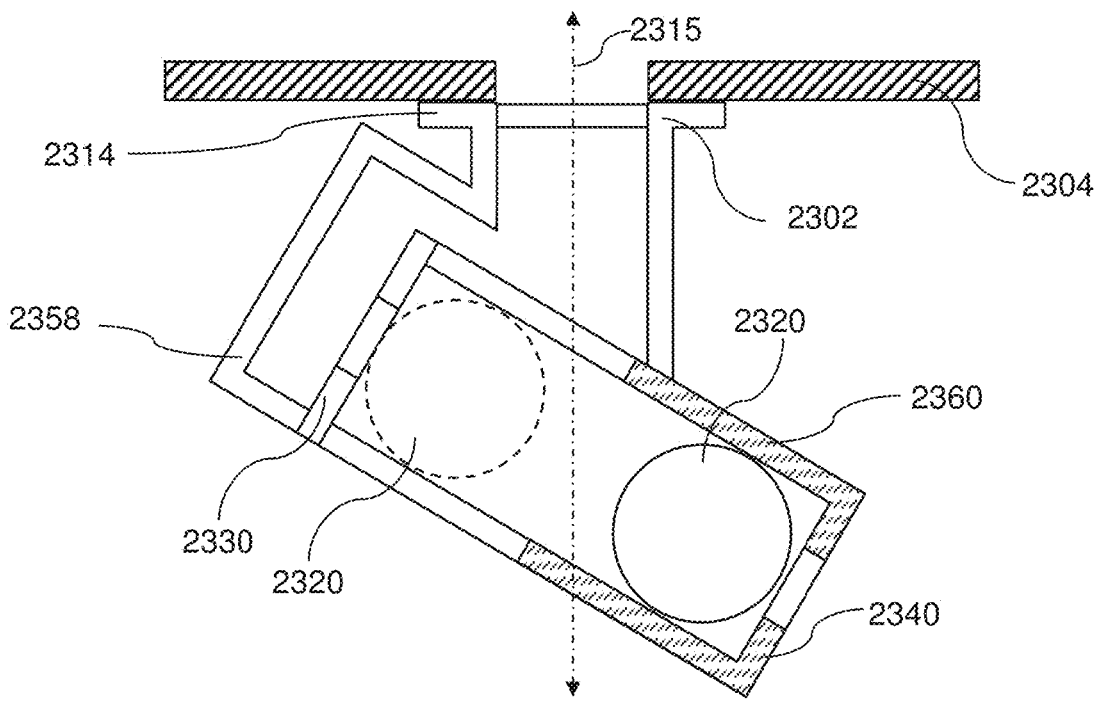
FIG. 23 is a top cross-sectional view of an alternative embodiment of a device for indicating a directional differential pressure

FIG. 23 illustrates a similar embodiment a shown in FIG. 22, but with a second conduit portion 2358 and a travel path section 2360 being transverse to a base plate 2314. This embodiment is shown as being non-rotatable, though the structure may be mounted in a rotating manner to a baseplate to allow rotation. An imaginary axis is shown as perpendicular to the baseplate and/or barrier 2304 and passes through a center of the first conduit portion 2302 where the first conduit portion is configured to reach the barrier 2304. This imaginary axis intersects the second conduit portion 2358, and movable element 2320 may at least partially cross the axis, and may fully cross the axis as shown in FIG. 23. The movable element 2320 may be positioned entirely to one side of the imaginary axis 2315 when contacting a proximal ball stop 2330, and may be positioned entirely to the opposite side of the imaginary axis when contacting a distal ball stop 2340.

The cross-hatched portion of the movable element travel path section 2360 may be transparent in some embodiments, while the non-cross-hatched portion may be opaque in some embodiments, such that the movable element 2320 is visible when located at the distal ball stop 2340, and not as readily visible when located at proximal ball stop 2330.

Various embodiments disclosed herein may include a threshold directional differential pressure set point indicator mounted to the baseplate—the threshold directional pressure difference being the difference which is sufficient to cause the movable element to move from a lower region of the inclined conduit to a higher region. The directional differential pressure set point indicator may include, for example, a bubble vial, a rotating weighted pendulum pointer, or any other suitable component that responds to the incline of the conduit. In the descriptions presented above, the pitch and the roll indicators, used together, provide a calibration to allow the device to be installed to a desired pitch and roll orientations of the inclined conduit containing the moveable element, such that the desired orientation corresponds to the desired directional differential pressure set point between the two separate spaces.

The pressure difference required to move the ball from a home position (the ball's position when there is no pressure difference between the rooms) can vary based at least on the physical features of the conduit (e.g., passageway diameter, straightness/curvature, surface finish), physical features of the ball (e.g., diameter, weight, surface finish), degree of incline of the conduit, fluid properties of the media between compartments, and the orifice sizes at the end stops. In many cases, each of the above parameters is known to a sufficient degree such that threshold directional pressure differences can be linked to the angle of inclination of the conduit portion within which the movable element travels. In some embodiments, balls of different weights may be used to adjust the threshold pressure differences. In such embodiments, the conduit angle may or may not be adjustable.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room's ventilation system exhausts more air than is supplied within it to an extent that the negative pressure is of a greater magnitude than any adjacent space. Thus, the device may be installed in the corridor, outside of the isolation room. The inclined conduit is installed with a downward orientation such that the end of the conduit that is closer to the wall toward the isolation room is at a higher position than the opposite end of the conduit that is away from the wall in the corridor.

When the net directional differential pressure between the isolation room and the outside space is zero (e.g., a door between the room and the outside space is opened), or the pressure in the isolation room is greater than the adjacent spaces, the ball will fall to the lower end of the conduit such that an observer in the corridor would see the ball at the bottom of the lower end, farthest away from the wall. When the appropriate degree of negative pressure is applied to the room to overcome gravity and the device characteristics, the ball moves upwardly within the conduit toward the wall to the vertically higher end of the inclined conduit. That is, the difference between the pressure of the isolation room and the pressure in the corridor outside on the opposite side of the wall causes forces on the ball that are sufficient to move the ball upwardly, thereby indicating that at least the appropriate direction of air flow through an opening between the rooms and degree of negative pressure is applied to the isolation room to prevent the escape of infectious pathogen air in the isolation room. It should be noted that Applicant has appreciated that the communicating conduit can not only be through one wall or barrier and sense the pressure conditions on each side, but, in some embodiments, the conduit may leave a room and pass through adjacent spaces and open up to a space not immediately adjacent to the initial room.

In the case of a hospital operating room that is required to exhibit a positive pressure, so as to substantially prevent potentially contaminated air from flowing into the room from a surrounding space, the device may be installed in the corridor outside of the operating room such that the end of the conduit that extends toward the operating room is at a lower position than the opposite end of the conduit that extends away from the operating room and into the corridor. Thus, when a suitable amount of positive pressure is applied to the operating room, there is sufficient directional differential pressure to move the ball upwardly, farthest away from the wall to the higher end of the conduit.

The inclined conduit containing the ball may be clear to allow visibility of the position of the ball. The conduit may be of a length that is twice as long as the diameter of the ball in some embodiments. The conduit may have an opaque cover at the half-end of the conduit closest to the wall the device is mounted to on one side of the wall. When the ball travels to a position closest to the wall, the ball may be hidden when the device is viewed from the side. This feature facilitates a view of the position of the ball.

When installed, the conduit may be oriented at an appropriate angle of inclination that corresponds to the desired threshold differential pressure set point. In some embodiments, the desired differential pressure set point may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column manometer. It will be appreciated that devices of the present disclosure may provide an indication of other differential pressures between adjacent spaces outside of these ranges.

Physical features other than the incline of the conduit may provide an indication of whether the directional differential pressure between spaces meets a certain threshold. For instance, the type of ball placed within the conduit may be chosen based on particular characteristics, such as weight or surface finish of the ball. For example, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate. For example, two or more movable elements having different weights may be provided, each with a different color and/or markings. The markings may indicate what threshold differential pressure set point is set when the particular movable element (e.g., ball) is used in the conduit. When the device is configured to permit only one inclination, the movable element may have a pressure marking directly on the movable element. A user may select which movable element (e.g., ball) to place in the device from among a plurality of movable elements of different weights. Or the user may select which movable element (e.g., ball) to place in the device from among a plurality of movable elements having different diameters. In this manner, a second ball may be swapped for a first ball by removing the first ball from the conduit and inserting the second ball into the conduit. Other parameters may include the diameter of a ball and the inside diameter of the inclined conduit containing the ball.

In some embodiments, an end stop that forms a suitable fit (e.g., interference fit, snap fit) over an end of a conduit may include a sound attenuator. In some cases, a movable element may be a plastic ball (e.g., a ping pong ball) and the end stop may be made of a hard plastic. Thus, without inclusion of the sound attenuator between the conduit and the end stop, when the ball impacts against the end stop, an abrupt sound may be produced which can be easily heard by a person located in the space where the impact occurs, and possibly in an adjacent space where the other open end of the conduit resides. When the sound attenuator is placed between the conduit and the end stop, impact of the ball against the sound attenuator will produce a much softer sound which is not as readily noticeable as compared with the sound produced when the energy-absorbing material is not present. The sound attenuator may be formed in a separate layer on the end stop, or may be integrated into the end stop (e.g., the end stop may exhibit a geometry similar to a diaphragm), as the present disclosure is not so limited.

In some embodiments, there may not be an alignment of the travel path of the center of the ball and an opening at the end of the conduit. For example, an interior-facing portion of an opening at the end of the conduit may be arranged and positioned such that the movable element substantially prevents air flow when the movable element abuts the interior-facing portion of the opening, yet a center axis of the opening (e.g., the centroid of the area of the opening) is not aligned with a travel path of a center of the movable element. A ramp may be present toward the end of the conduit such that the movable element is pushed up into the opening.

Screws may be used to mount a baseplate to a wall, though other suitable fasteners may be used. It should be noted that while screws are shown in exemplary embodiments described herein, any suitable arrangement may be employed to join various components.

The conduit(s) of exemplary embodiments described herein may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits. For example, a flexible conduit may be used within a barrier as part of a connection between a first space on one side of the barrier and a second space on the other side of the barrier. The flexible conduit may connect to a collar on the back side of baseplate in some embodiments. A conduit need not be cylindrical in shape as any suitable shape may be used.

For purposes herein, a first component being connected or attached to a second component does not necessarily require that the first and second component be directly connected to one another. The first component may be connected to the second component via a third component. For example, a second conduit portion may be attached to a baseplate via a first conduit portion. Or a conduit portion may be attached to a baseplate via a rotating base.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device for indicating a presence of a directional differential pressure between a first space and a second space separated from the first space by a barrier, the device comprising:
   a baseplate;
   a first inclined conduit connected to the baseplate and configured to be fluidically connected to the first space and the second space;
   wherein the first inclined conduit is connected to the baseplate with a first mounting portion, and the first inclined conduit is inclined at a first angle relative to a horizontal plane when the baseplate is oriented vertically;
   wherein the first mounting portion is removable from the baseplate without damaging the baseplate or the first mounting portion;
   at least one movable element disposed within the first inclined conduit and movable from a first, vertically lower region of the first inclined conduit to a second, vertically higher region of the first inclined conduit in response to the directional differential pressure between the first space and the second space being greater than a threshold differential pressure; and
   a second mounting portion, wherein when the first mounting portion is removed from the baseplate and the second mounting portion is connected to the baseplate, the second mounting portion is configured to hold an inclined conduit at a second angle, different from the first angle, relative to the horizontal plane when the baseplate is oriented vertically.

2. The device as in claim 1, wherein the second mounting portion holds a second inclined conduit which is different from the first inclined conduit.

3. The device as in claim 1, wherein the second mounting portion holds the first inclined conduit.

4. The device as in claim 1, wherein the first mounting portion includes one or more snap-fit connectors.

5. The device as in claim 4, wherein the baseplate includes at least one notch to receive a first snap-fit connector of the one or more snap-fit connectors.

6. The device as in claim 5, wherein an interaction between the one or more snap-fit connectors and the at least one notch prevents rotation of the first inclined conduit when the first mounting portion is attached to the baseplate.

7. The device as in claim 1, wherein the first mounting portion is configured such that the first mounting portion is removable from the baseplate without use of a tool.

8. The device as in claim 1, wherein the baseplate is configured to be secured to the barrier such that the baseplate is not rotatable relative to the barrier while secured to the barrier, and wherein whenever the baseplate is secured to the barrier such that the baseplate is not rotatable relative to the barrier, the angle of the first inclined conduit relative to the horizontal plane is not adjustable.

9. The device as in claim 1, further comprising a pitch indicator.

10. The device as in claim 1, further comprising a roll indicator.

11. The device as in claim 1, wherein the device is configured such that no part of the device protrudes into the barrier when the device is mounted to a flat, vertical barrier having an opening in the barrier.

12. A device for indicating a presence of a directional differential pressure between a first space and a second space separated from the first space by a barrier, the device comprising:
a baseplate;
an inclined conduit connected to the baseplate and configured to be fluidically connected to the first space and the second space, and the inclined conduit is inclined at an angle relative to a horizontal plane when the baseplate is oriented vertically;
a mounting portion which supports the inclined conduit, wherein the mounting portion is connected to the baseplate;
wherein the mounting portion includes a first locator, the baseplate includes a complementary second locator, and the first locator is configured to engage with the second locator to secure and orient the mounting portion at a desired roll orientation relative to the baseplate;
wherein whenever the baseplate is secured to the barrier such that the baseplate is not rotatable relative to the barrier, and the mounting portion is secured to the baseplate, the angle of the inclined conduit relative to the horizontal plane is not adjustable without removing the mounting portion from the baseplate; and
at least one movable element disposed within the inclined conduit and movable from a first, vertically lower region of the inclined conduit to a second, vertically higher region of the inclined conduit in response to the directional differential pressure between the first space and the second space being greater than a threshold differential pressure.

13. The device as in claim 12, wherein the mounting portion includes one or more snap-fit connectors.

14. The device as in claim 13, wherein the baseplate includes at least one notch to receive a first snap-fit connector of the one or more snap-fit connectors.

15. The device as in claim 14, wherein an interaction between the one or more snap-fit connectors and the at least one notch prevents rotation of the inclined conduit when the mounting portion is attached to the baseplate.

16. The device as in claim 12, wherein the mounting portion is removable from the baseplate without damaging the baseplate or the mounting portion.

17. The device as in claim 12, wherein the mounting portion is configured such that the mounting portion is removable from the baseplate without use of a tool.

18. The device as in claim 12, wherein the baseplate is configured to be secured to the barrier such that the baseplate is not rotatable relative to the barrier while secured to the barrier, and wherein whenever the baseplate is secured to the barrier such that the baseplate is not rotatable relative to the barrier, the angle of the inclined conduit relative to the horizontal plane is not adjustable.

19. The device as in claim 12, further comprising a pitch indicator.

20. The device as in claim 12, further comprising a roll indicator.

* * * * *